United States Patent
Wakahara et al.

(10) Patent No.: US 7,146,851 B2
(45) Date of Patent: Dec. 12, 2006

(54) DIAGNOSTIC APPARATUS FOR VARIABLE VALVE CONTROL SYSTEM

(75) Inventors: Keiji Wakahara, Inazawa (JP); Hirofumi Shoda, Toyota (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/050,828

(22) Filed: Jan. 27, 2005

(65) Prior Publication Data
US 2005/0204805 A1    Sep. 22, 2005

(30) Foreign Application Priority Data
Jan. 29, 2004   (JP)   ............................. 2004-021710
Mar. 4, 2004    (JP)   ............................. 2004-060343

(51) Int. Cl.
    *G01M 15/00*    (2006.01)
(52) U.S. Cl. ....................... 73/117.3; 73/116; 73/117.2; 73/118.1
(58) Field of Classification Search ................. 73/116, 73/117.2, 117.3, 118.1
    See application file for complete search history.

(56) References Cited

U.S. PATENT DOCUMENTS

| | | | | |
|---|---|---|---|---|
| 5,060,604 A * | 10/1991 | Seki et al. | ............... | 123/90.16 |
| 5,522,363 A | 6/1996 | Gotoh | ................... | 123/339.15 |
| 5,542,404 A | 8/1996 | Hasegawa | .................. | 123/690 |
| 6,314,375 B1 | 11/2001 | Sasaki et al. | ................. | 702/34 |
| 6,691,653 B1 * | 2/2004 | Denz | ....................... | 123/90.15 |
| 6,763,707 B1 * | 7/2004 | Kumagai et al. | .......... | 73/117.3 |
| 6,792,901 B1 * | 9/2004 | Sugiyama et al. | ....... | 123/90.15 |
| 7,063,057 B1 * | 6/2006 | Waters et al. | ............. | 123/90.16 |
| 2002/0104520 A1 * | 8/2002 | Nakasaka et al. | ........... | 123/673 |
| 2003/0110845 A1 * | 6/2003 | Kumagai et al. | ............. | 73/116 |
| 2003/0121316 A1 * | 7/2003 | Wakahara | ................... | 73/118.1 |

FOREIGN PATENT DOCUMENTS

| | | |
|---|---|---|
| JP | 6-45644 | 11/1994 |
| JP | 7-34946 | 2/1995 |
| JP | 9-88643 | 3/1997 |

* cited by examiner

*Primary Examiner*—Edward Lefkowitz
*Assistant Examiner*—Freddie Kirkland, III
(74) *Attorney, Agent, or Firm*—Nixon & Vanderhye, P.C.

(57) ABSTRACT

ECU calculates variations of air-fuel ratios of respective cylinders and variations of air-fuel ratios of all the cylinders in variable intake valve lift devices of two cylinder groups. Presence and absence of an abnormality is determined on the basis of whether ratios of variations of air-fuel ratios of respective cylinders to variations of air-fuel ratios of all the cylinders are less than an abnormality threshold. Whether which of variable intake valve lift devices of the cylinder groups is abnormal is determined from control modes of the variable intake valve lift devices of the respective cylinder groups, and the relationship between that cylinder group, to which a cylinder being maximum in air-fuel ratio belongs, and cylinder group, to which a cylinder being minimum in air-fuel ratio belongs.

31 Claims, 12 Drawing Sheets

DIAGNOSTIC APPARATUS FOR VARIABLE VALVE CONTROL SYSTEM

CROSS REFERENCE TO RELATED APPLICATIONS

This application is based on and incorporates herein by reference Japanese Patent Applications No. 2004-21710 filed on Jan. 29, 2004 and No. 2004-60343 filed on Mar. 4, 2004.

FIELD OF THE INVENTION

The present invention relates to an apparatus that diagnoses an abnormality in a variable valve lift control system that varies the valve lift characteristics of intake valves and/or exhaust valves of an internal combustion engine. The present invention relates to an apparatus that diagnoses an abnormality of an internal combustion engine mounting multiple intake efficiency varying means, which vary the intake efficiency.

BACKGROUND OF THE INVENTION

In recent years, in internal combustion engines mounted to vehicles, air-fuel ratios of respective cylinders (cylinder-by-cylinder air-fuel ratios) are calculated on the basis of an output of an air-fuel ratio sensor provided to an exhaust manifold, through which exhaust gases from the respective cylinders flow, as described in, for example, JP-B2-2684011. Here, air-fuel ratios are subjected to feedback control for each cylinder on the basis of air-fuel ratios of respective cylinders. A cylinder or cylinders being abnormal in air-fuel ratio are detected on the basis of air-fuel ratio feedback correction terms of the respective cylinders.

Besides, in recent years, internal combustion engines mounts variable valve lift devices, which vary lift of intake valves and exhaust valves, and variable valve timing devices, which control opening and closing timings. The variable valve lift devices and the variable valve timing devices are for the purpose of an enhancement in intake efficiency, an enhancement in output, reduction in fuel consumption, reduction in exhaust emission, or the like in internal combustion engines mounted to vehicles. Variable valve lift devices are various in construction such that valve lifts of multiple cylinders are varied together by a single hydraulically driven variable valve lift device. Alternatively, electromagnetically driven valves are provided to each cylinder to independently vary valve lift for each cylinder. An abnormality diagnosis system for detection of abnormality is also demanded of such respective devices, similarly to other air-fuel ratio control systems.

In the abnormality diagnosis system disclosed in JP-B2-2684011, a cylinder or cylinders being abnormal in air-fuel ratio are detected on the basis of air-fuel ratio feedback correction terms of respective cylinders. Here, the cause for abnormality in air-fuel ratio of the cylinder or cylinders is considered to be based on abnormality in a fuel system such as fuel injection valves, abnormality in an air system, abnormality in an ignition system, or the like. Therefore, even when a cylinder or cylinders being abnormal in air-fuel ratio can be detected, the cause for abnormality in air-fuel ratio of the cylinder or cylinders is unclear. Accordingly, in the abnormality diagnosis system disclosed in JP-B2-2684011, even when variable valve lift devices fail to cause abnormality in air-fuel ratio of the cylinder or cylinders, the cause of the abnormity cannot be determined to perform an appropriate fail-safe processing.

Besides, with hydraulically driven variable valve lift devices, valve lifts of multiple cylinders are varied by a single variable valve lift device. In case of an increase in number of cylinders, it is difficult to ensure a sufficient hydraulic drive pressure with a single variable valve lift device. Therefore, cylinders are divided into multiple cylinder groups, so that variable valve lift devices, which are hydraulically driven independently, are provided to each cylinder group. In a system having multiple variable valve lift devices, only a variable valve lift device of one cylinder group may become abnormal. Accordingly, an abnormality diagnosis system is demanded, such that the abnormality diagnosis system can determine which variable valve lift device of cylinder groups is abnormal.

When the abnormality diagnosis system disclosed in JP-B2-2684011 is applied to such system having multiple variable valve lift devices, the following problems may arise.

In the system, air flowing through a single intake pipe is distributed to respective cylinders through intake manifolds of the respective cylinders. Therefore, when variable valve lift devices in one of cylinder groups fail, and an intake air quantity of the fault cylinder group is disturbed, intake air quantities of the other normal cylinder groups are disturbed. As a result, not only an abnormal cylinder group but also normal cylinder groups are disturbed in air-fuel ratio, so that a cylinder or cylinders being abnormal in air-fuel ratio may be erroneously detected.

Hereupon, sensors may be provided to variable valve lift devices of respective cylinder groups for respectively detecting lift and hydraulic pressure, so that it may be determined that which variable valve lift device of the cylinder groups is abnormal on the basis of outputs from the sensors. However, sensors for detection of lift and hydraulic pressure need to be newly provided, and cost may be increased.

In abnormality diagnosis of variable valve timing devices described in JP-A-9-88643, an intake air quantity Q1 is detected just before the start of abnormality diagnosis, and is stored in memory, subsequently, abnormality diagnosis is started. In abnormality diagnosis, variable valve timing devices are forcedly driven, and an intake air quantity Q2 is detected for calculation of a variation (Q1–Q2) of an intake air quantity before and after the start of abnormality diagnosis. By comparing the calculated value with an abnormality threshold, normality/abnormality of the variable valve timing devices is determined.

However, in the abnormality diagnosis system disclosed in JP-A-9-88643, abnormality diagnosis is not executed as long as a predetermined abnormality diagnosis execution condition is not met in an engine operation. Accordingly, even when abnormality is caused in variable valve timing devices, the abnormality may not be early detected.

As a countermeasure, it is conceivable to relax the abnormality diagnosis execution condition to increase a frequency, in which abnormality diagnosis is executed in engine operation. In a method of abnormality diagnosis disclosed in JP-A-9-88643, variable valve timing devices are forcedly driven. However, when the frequency, in which abnormality diagnosis is executed, is increased, harmful influences, such as torque shock caused by forced driving of variable valve timing devices are increased. As a result, operability becomes worse.

Hereupon, instead of forced driving of variable valve timing devices, it is conceivable to monitor the behavior of an engine rotating speed, an intake air quantity, and the like in engine operation to early detect an abnormal behavior. However, with engines having multiple intake efficiency varying means, which vary the intake efficiency, such as variable valve timing devices, variable valve lift devices, and the like, even when an abnormal behavior in intake air quantity and the like is detected in engine operation, it cannot be determined that which of multiple intake efficiency varying means is abnormal.

SUMMARY OF THE INVENTION

It is a first object of the present invention to diagnose an abnormality in a variable valve lift device in distinction from other abnormalities in an air system, a fuel system, and the like. It is a second object of the present invention to inexpensively provide an apparatus that diagnoses an abnormality in a variable valve lift control system having multiple variable valve lift devices and determines a part being abnormal. It is a third object of the present invention to provide an apparatus that diagnoses an abnormality in an internal combustion engine having multiple intake efficiency varying means for variation of intake efficiency. The apparatus can perform abnormality diagnosis without making operability get worse when all the multiple intake efficiency varying means normally operate. The apparatus can early detect an abnormality when any one of the multiple intake efficiency varying means becomes abnormal, and can determine the intake efficiency varying means, in which an abnormality is actually caused.

In order to attain the first and second objects, a variable valve lift control system is provided with an apparatus that diagnoses an abnormality. The variable valve lift control system has a variable valve lift device that varies the valve lift characteristics of at least one of intake valves and exhaust valves of each cylinder in an internal combustion engine. The apparatus, which diagnoses an abnormality, includes a cylinder-by-cylinder air-fuel ratio estimation means and an abnormality diagnosis means. The cylinder-by-cylinder air-fuel ratio estimation means estimates the air-fuel ratio of each cylinder. The abnormality diagnosis means diagnoses presence and absence of an abnormality in the variable valve lift device on the basis of air-fuel ratio estimate value of each cylinder estimated by the cylinder-by-cylinder air-fuel ratio estimation means and a controlled state of the variable valve lift device.

The abnormality diagnosis means determines a cylinder, which is abnormal in valve lift action, on the basis of the magnitude relation of the air-fuel ratio estimate value of each cylinder and the controlled state of the variable valve lift device. The abnormality diagnosis means determines that a cylinder having a minimum air-fuel ratio estimate value is abnormal when the variable valve lift device is in a low-lift mode, and determines that a cylinder having a minimum air-fuel ratio estimate value is abnormal when the variable valve lift device is in a high-lift mode.

The abnormality diagnosis means prohibits abnormality diagnosis of the variable valve lift device, or makes an abnormality determination condition strict, when an operating state of the internal combustion engine is in an operating range, in which a change in intake air quantity is small relative to a change in the valve lift characteristics. The abnormality diagnosis means determines to be abnormal when a ratio of a variation of the air-fuel ratio of each cylinder to a variation of the air-fuel ratios of all the cylinders is less than an abnormality threshold. In the abnormality diagnosis means, the abnormality threshold is established to a small value to make the abnormality determination condition be strict.

Alternatively, a variable valve lift control system has variable valve lift devices of multiple systems, which vary the valve lift characteristic of at least one of intake valves and exhaust valves of each cylinder in an internal combustion engine. In this case, the abnormality diagnosis means determines a variable valve lift device, which is abnormal, out of the variable valve lift devices of the multiple systems on the basis of the magnitude relation of an air-fuel ratio estimate value of each cylinder and the controlled state of the variable valve lift device of the multiple systems. The abnormality diagnosis means determines a variable valve lift device, which is abnormal, out of the variable valve lift devices of the multiple systems on the basis of the magnitude relation of the air-fuel ratio estimate value of each cylinder when a controlled state of a variable valve lift device of any system is forcedly modified.

In order to attain the third object, an internal combustion engine having multiple intake efficiency varying means for variation of intake efficiency is provided with an apparatus that diagnoses an abnormality. The apparatus, which diagnoses an abnormality in an internal combustion engine, includes an operating-state detection means, a first abnormality determination means, and a second abnormality determination means.

The operating-state detection means detects an operating state of the internal combustion engine. The first abnormality determination means determines whether a state of intake efficiency varying control, which is performed by the multiple intake efficiency varying means, is abnormal, on the basis of an operating state detected by the operating-state detection means. The second abnormality determination means forcedly drives the multiple intake efficiency varying means one by one when it is determined by the first abnormality determination means that a state of the intake efficiency varying control is abnormal. The second abnormality determination means determines intake efficiency varying means, which is abnormal, depending upon whether an operating state detected by the operating-state detection means changes in accordance with forced driving of the intake efficiency varying means.

The multiple intake efficiency varying means includes at least one of a variable valve timing device, a variable valve lift device, and a variable intake passage device. The variable valve timing device controls an opening and closing timing of at least one of intake valves and exhaust valves. The variable valve lift device controls lift of at least one of intake valves and exhaust valves. The variable intake passage device varies a length of an intake passage. The operating-state detection means detects at least one of intake pipe pressure, an intake air quantity, the air-fuel ratio, and engine rotating speed. The second abnormality determination means determines whether the intake efficiency varying means is abnormal, depending upon whether a detected value of the operating-state detection means changes in amplitude in accordance with forced driving of the intake efficiency varying means.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENTS (First Embodiment)

Figure 1:
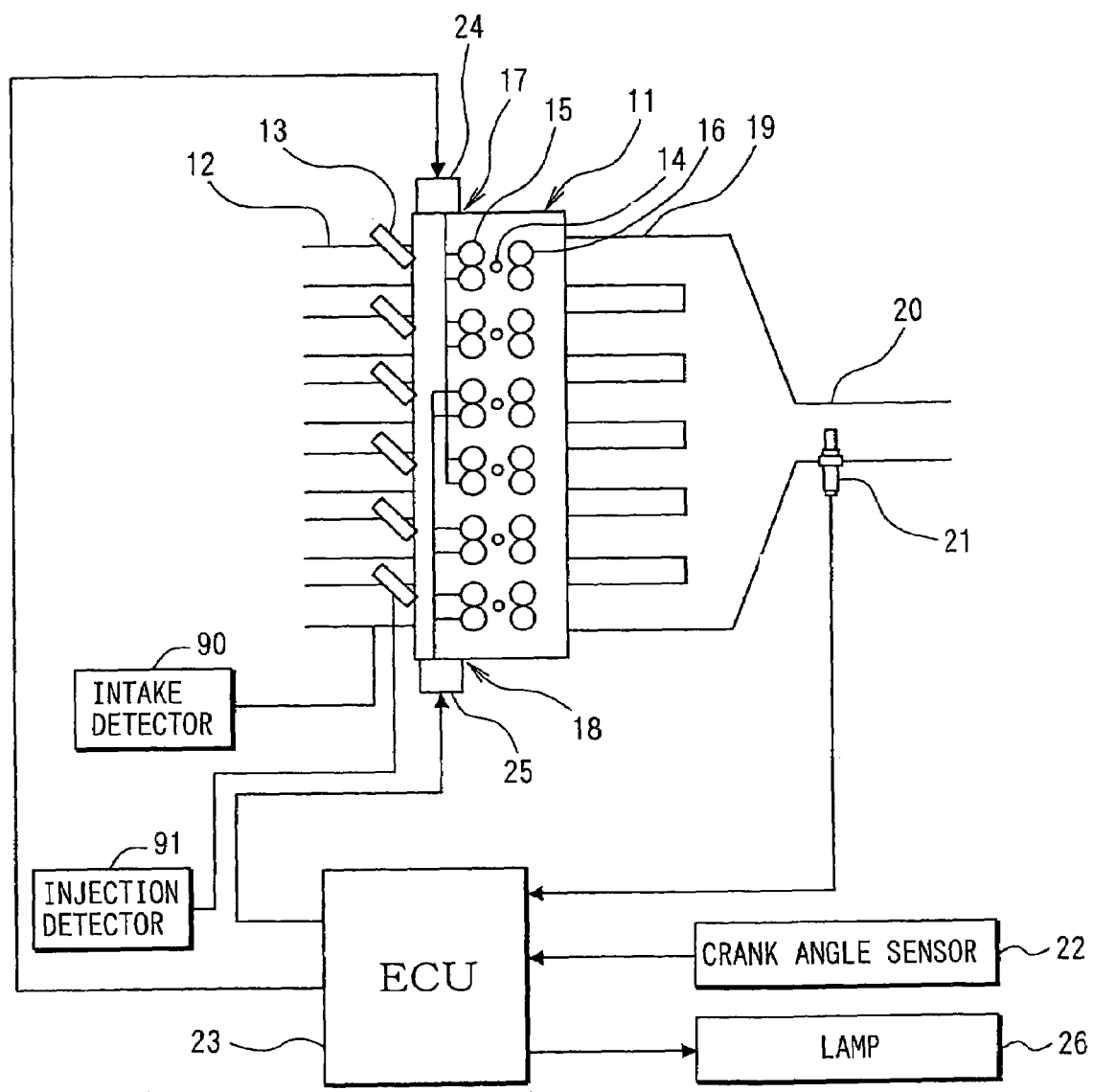
FIG. 1 is a schematic view showing an entire engine control system according to a first embodiment of the present invention.

In an engine control system shown in FIG. 1, an internal combustion engine, for example, a series 6-cylinder engine 11 has six cylinders including a first cylinder to a sixth cylinder. Fuel injection valves 13, which jet fuel, are respectively mounted in the vicinity of intake ports of intake manifolds 12 of respective cylinders of the engine 11. Ignition plugs 14 are mounted to each cylinder on a cylinder head of the engine 11, and spark discharge of the respective ignition plugs 14 causes ignition of fuel-air mixture in the cylinders.

Besides, variable intake valve lift devices 17, 18 for two systems (two cylinder groups) are mounted to the engine 11. The variable intake valve lift device 17 for one of the systems varies lift of intake valves 15 of the cylinder group (A group) including such as the first, second, and fourth cylinders. The variable intake valve lift device 18 for the other of the systems varies lift of intake valves 15 of the cylinder group (B group) including such as the third, fifth, and sixth cylinders. Hydraulic control valves 24, 25 are respectively provided to the variable intake valve lift devices 17, 18 of the respective cylinder groups. The respective hydraulic control valves 24, 25 control hydraulic pressure for driving the variable intake valve lift devices 17, 18 of the respective cylinder groups to vary lift of the intake valves 15 of the respective cylinder groups.

Exhaust manifolds 19 of the respective cylinders of the engine 11 collect at an exhaust collector 20. An air-fuel ratio sensor 21 is provided to the exhaust collector 20 to detect an air-fuel ratio of exhaust gases. A crank-angle sensor 22 is mounted to a cylinder block of the engine 11. The crank-angle sensor 22 outputs a pulse signal each time a crankshaft of the engine 11 rotates for a predetermined crank angle. A crank angle and an engine speed are detected on the basis of an output signal of the crank-angle sensor 22.

Outputs of the various sensors are input to an engine control circuit (ELECTRONIC CONTROL UNIT, ECU) 23. The ECU 23 serves as a control means. The ECU 23 is mainly constructed of a microcomputer. The ECU 23 executes various engine control programs stored in a built-in ROM (storage medium) to control fuel injection quantities of the fuel injection valves 13 and ignition timings of the ignition plugs 14 according to the engine operating state.

Figure 2:
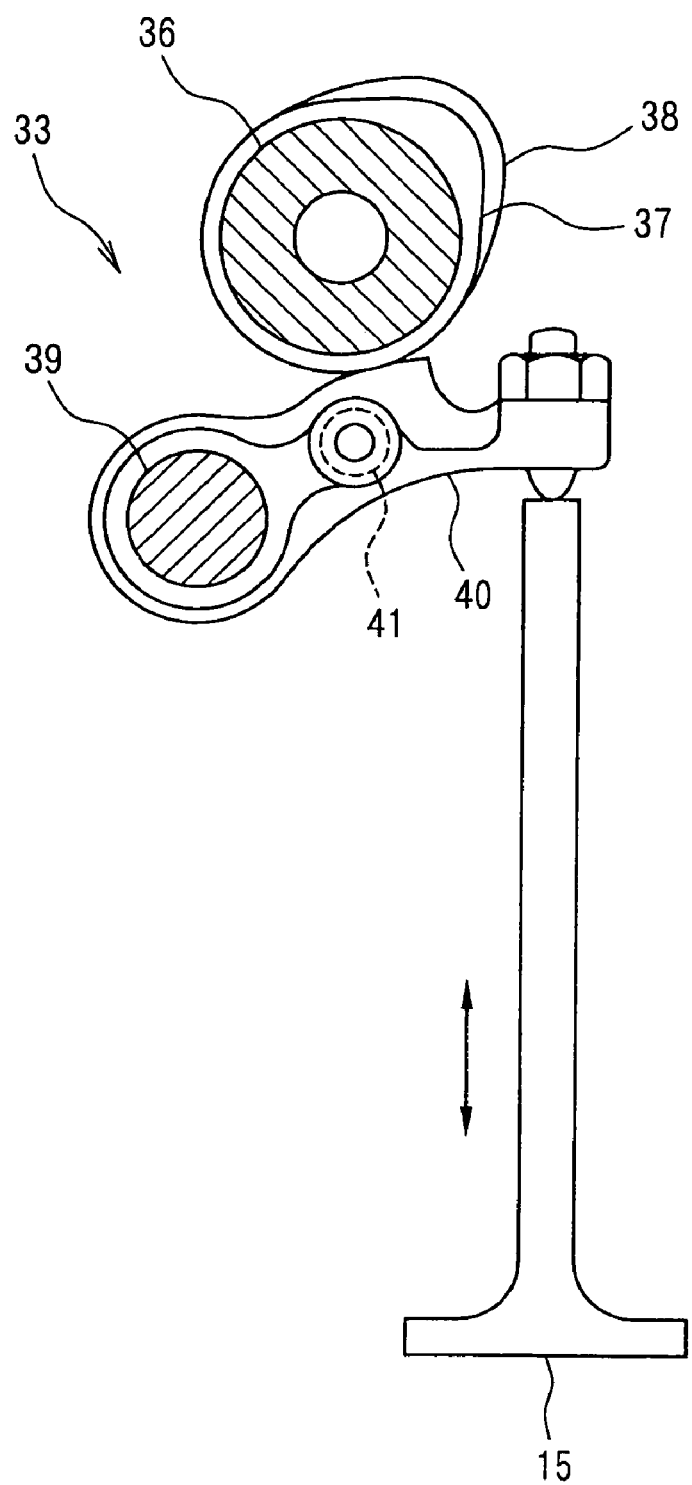
FIG. 2 is a side view showing a variable intake valve lift device.

As shown in FIG. 2, low-lift cams 37 and high-lift cams 38, both of which are different in cam profile from each other, are provided to a camshaft 36 on a side of the intake valves 15 to be capable of integrally rotating. A rocker shaft 39 is provided below the camshaft 36. Rocker arms 40 are provided to be capable of vertically swinging around the rocker shaft 39. Upper ends of the intake valves 15 abut against tip ends of the rocker arms 40, so that vertical swinging of the rocker arms 40 causes the intake valves 15 to make lift motions in the vertical direction.

The rocker arms 40 construct a low-lift cam pushed portion (not shown), which abuts against the low-lift cam 37 to be pushed thereby, and a high-lift cam pushed portion (not shown), which abuts against the high-lift cam 38 to be pushed thereby. The low-lift cams 37 are formed to have an outer peripheral surface shape such that amounts, by which the rocker arms 40 (low-lift cam pushed portions) are pushed, decrease and a duration, during which such pushing is made, is shortened. The high-lift cams 38 are formed to have an outer peripheral surface shape such that amounts, by which the rocker arms 40 (high-lift cam pushed portions) are pushed, increase and a duration, during which such pushing is made, is extended.

The rocker arms 40 construct a hydraulic-drive type cam switching mechanism 41. The cam switching mechanism 41 switches over a low-lift cam effective state and a high-lift cam effective state to each other. In the low-lift cam effective state, the low-lift cams 37 push the rocker arms 40 (low-lift cam pushed portions) to drive the intake valves 15. In the high-lift cam effective state, the high-lift cams 38 push the rocker arms 40 (high-lift cam pushed portions) to drive the intake valves 15.

In case of switching over control modes of the respective variable intake valve lift devices 17, 18 to a low-lift mode, the cam switching mechanisms 41 are switched over to the low-lift cam effective state. In the low-lift cam effective state, the low-lift cams 37 push the rocker arms 40 (low-lift cam pushed portions) to drive the intake valves 15. Thereby, the rocker arms 40 are decreased in pushed amount and the intake valves 15 are decreased in lift. Besides, a duration, during which the rocker arms 40 are pushed, is shortened, and a duration, during which the intake valves 15 are opened, is shortened.

On the other hand, in case of switching over control modes of the respective variable intake valve lift devices 17, 18 to a high-lift mode, the cam switching mechanisms 41 are switched over to the high-lift cam effective state. In the high-lift cam effective state, the high-lift cams 38 push the rocker arms 40 (high-lift cam pushed portions) to drive the intake valves 15. Thereby, the rocker arms 40 are increased in pushed amount and the intake valves 15 are increased in lift. Besides, a duration, during which the rocker arms 40 are pushed, is extended, and a duration, during which the intake valves 15 are opened, is extended.

The ECU 23 switches a valve lift control command between a low-lift mode command and a high-lift mode command in accordance with the engine operating state (for example, a rotating speed, a load). The valve lift control command is output to the hydraulic control valves 24, 25 of the variable intake valve lift devices 17, 18 of the respective cylinder groups from the ECU 23. Thereby, control modes of the variable intake valve lift devices 17, 18 of the respective cylinder groups are switched between the low-lift mode and the high-lift mode.

Besides, the ECU 23 uses a cylinder-by-cylinder air-fuel ratio estimation model described later to estimate air-fuel ratios (cylinder-by-cylinder air-fuel ratios) of the respective cylinders on the basis of a detection value of the air-fuel ratio sensor 21, that is, an actual air-fuel ratio of exhaust gases flowing through the exhaust collector 20. The ECU 23 calculates cylinder-by-cylinder air-fuel ratio correction quantities on the basis of cylinder-by-cylinder air-fuel ratios in a manner to decrease dispersion in air-fuel ratio among the cylinders. The ECU 23 corrects fuel injection quantities (and/or intake air quantities) of the respective cylinders on the basis of cylinder-by-cylinder air-fuel ratio correction quantities to correct air-fuel ratios of fuel-air mixtures being supplied to the respective cylinders, for each cylinder.

Subsequently, an explanation will be given to a specific example of a model (cylinder-by-cylinder air-fuel ratio estimation model) that estimates air-fuel ratios of the respective cylinders on the basis of a detection value of the air-fuel ratio sensor 21, that is, an actual air-fuel ratio of exhaust gases flowing through the exhaust collector 20.

Taking notice of gas exchange in the exhaust collector 20, air-fuel ratios of the respective cylinders are estimated using a model. The model is obtained by modeling a detection value of the air-fuel ratio sensor 21 using the sum of both a history of air-fuel ratios of the respective cylinders in the exhaust collector 20, which is multiplied by a predetermined weight, and a history of a detection value of the air-fuel ratio sensor 21, which is multiplied by a predetermined weight. In addition, the Kalman filter is used as an observer.

More specifically, a model of gas exchange in the exhaust collector 20 is approximated by the following formula (1).

$$ys(t) = k1 \times u(t-1) + k2 \times u(t-2) - k3 \times ys(t-1) - k4 \times ys(t-2) \quad (1)$$

where ys indicates a detection value of the air-fuel ratio sensor 21, u indicates an air-fuel ratio of gases flowing into the exhaust collector 20, and k1 to k4 constants.

In the exhaust system, a first-order lag factor of gas, which inflows and mixes in the exhaust collector 20, exists, and a first-order lag factor, which is due to response lag of the air-fuel ratio sensor 21, exists. Hereupon, a history for twice in the past is referred to in the following formula (1) taking account of the first-order lag factors.

Converting the formula (1) into a state space model, the following formulae (2a), (2b) are derived.

$$X(t+1) = A \cdot X(t) + B \cdot u(t) + W(t) \quad (2a)$$

$$Y(t) = C \cdot X(t) + D \cdot u(t) \quad (2b)$$

where A, B, C, D indicate parameters of the model, Y a detection value of the air-fuel ratio sensor 21, X a cylinder-by-cylinder air-fuel ratio as a state variable, and W noise.

Further, the following formula (3) is obtained by designing the Kalman filter by the use of the above formulae (2a), (2b).

$$\hat{X}(k+1|k) = A \cdot \hat{X}(k|k-1) + K\{Y(k) - C \cdot A \cdot \hat{X}(k|k-1)\} \quad (3)$$

where $\hat{X}$ indicates air-fuel ratio estimate values of the respective cylinders, and K a Kalman gain. $\hat{X}(k+1|k)$ means that an estimate value of time (k+1) is determined on the basis of an estimate value of time (k).

Thus, a cylinder-by-cylinder air-fuel ratio estimation model with the Kalman filter type observer is constructed, so that air-fuel ratios of the respective cylinders can be sequentially estimated as a burning cycle proceeds.

Figure 3:
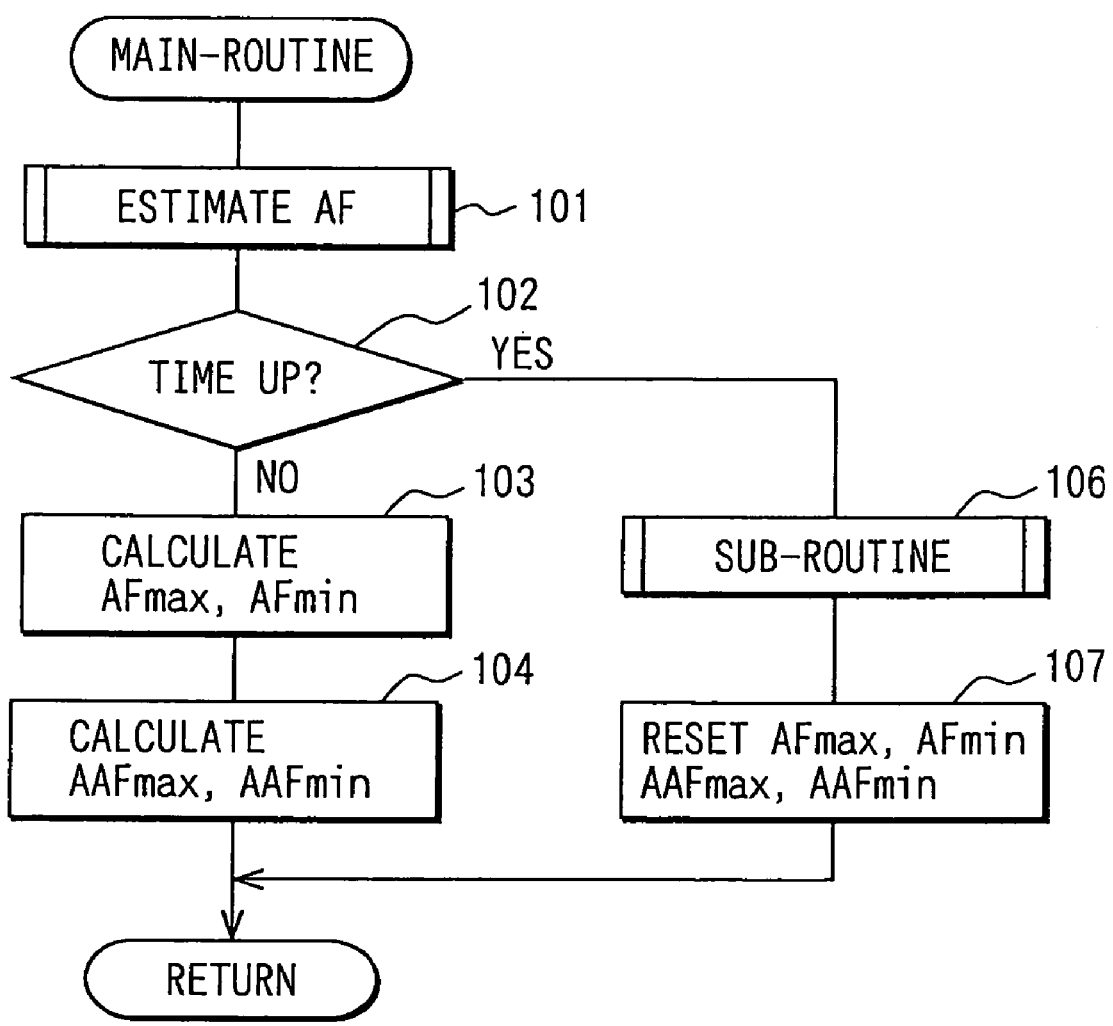
FIG. 3 is a flowchart showing an abnormality diagnosis main routine according to the first embodiment.
Figure 4:
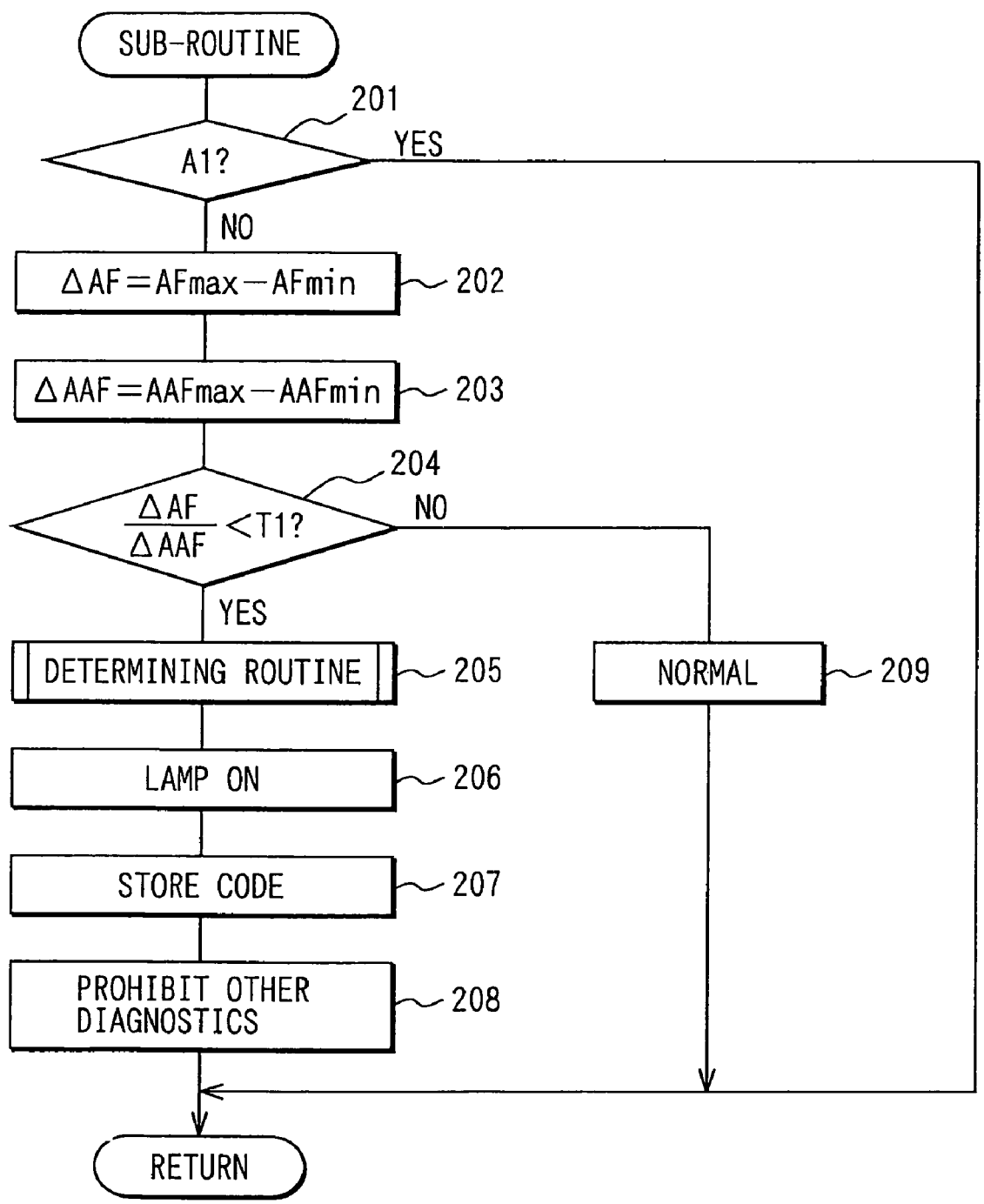
FIG. 4 is a flowchart showing an abnormality diagnosis sub-routine according to the first embodiment.
Figure 5:
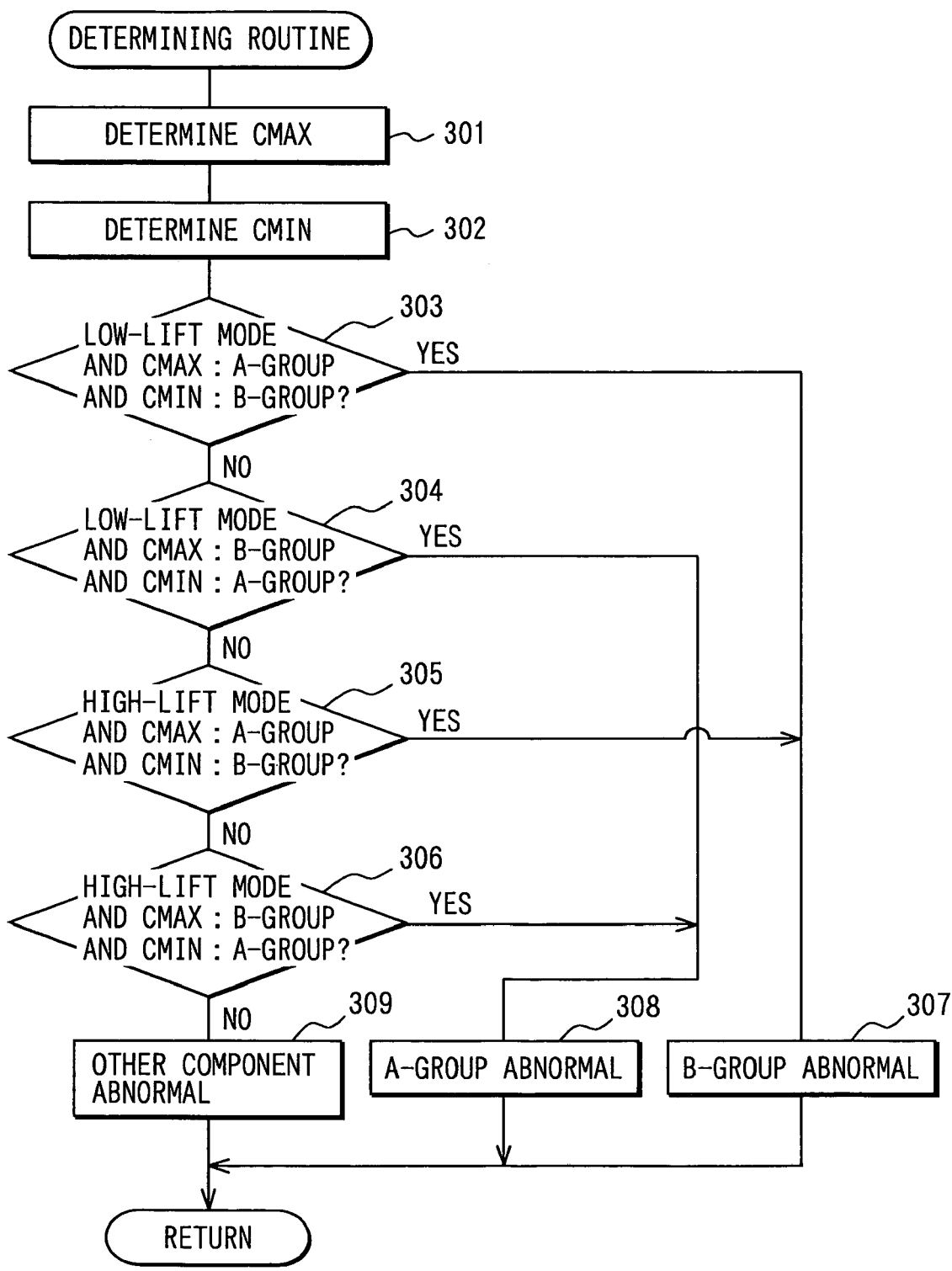
FIG. 5 is a flowchart showing an abnormality region determining routine according to the first embodiment.
Figure 6:
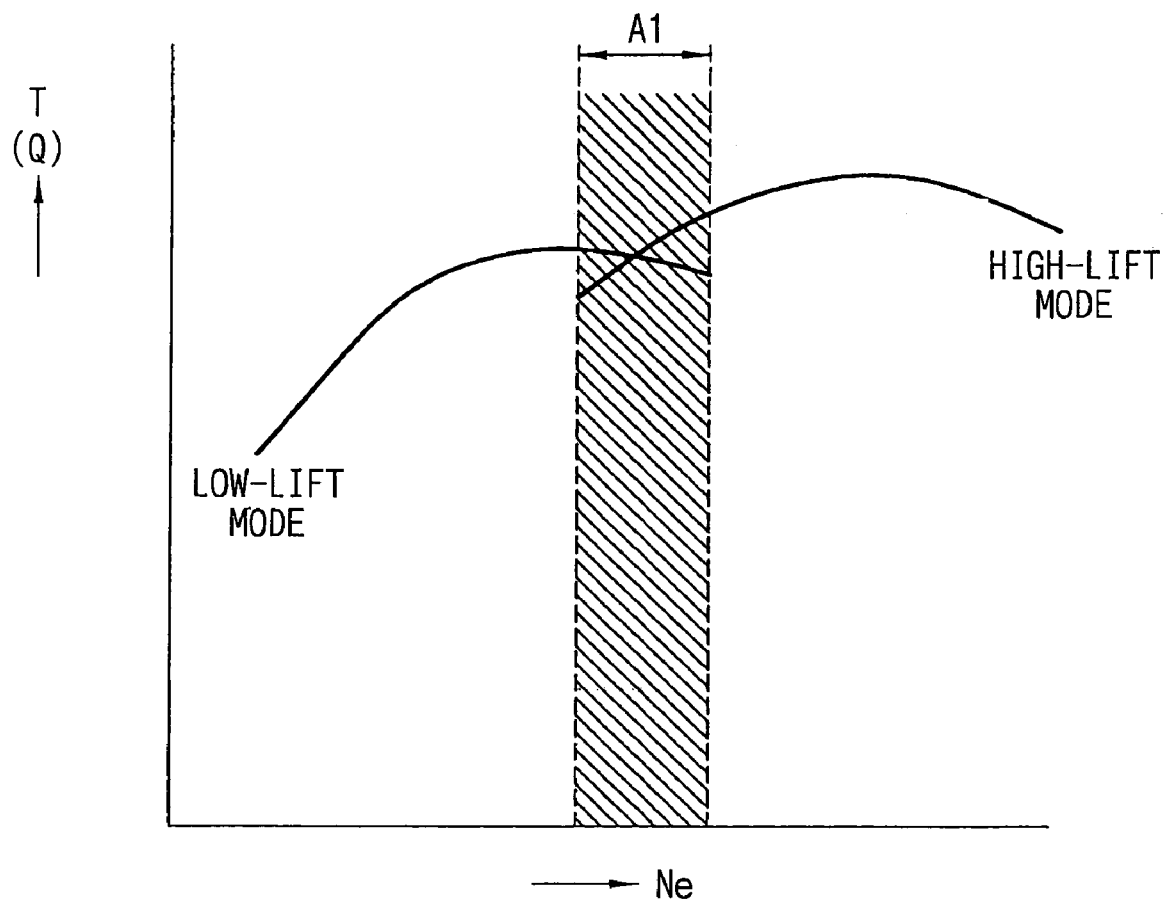
FIG. 6 is a graph showing the relationship among an engine rotating speed Ne, a shaft torque T, and an abnormality diagnosis prohibition range A1 according to the first embodiment.
Figure 8:
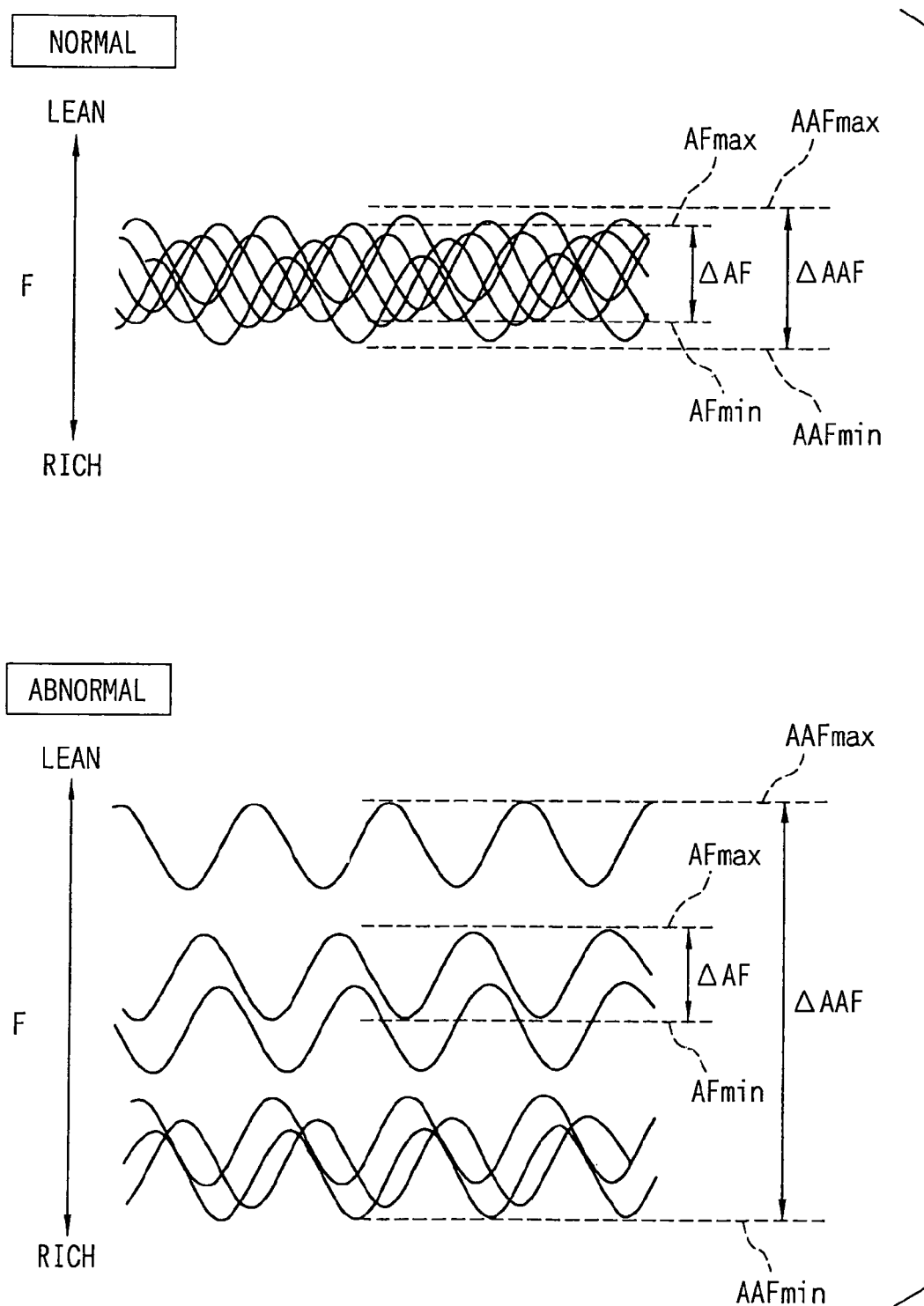
FIG. 8 is a time chart schematically showing the behavior of cylinder-by-cylinder air-fuel ratios according to the first embodiment.

Further, the ECU 23 executes respective routines shown in FIGS. 3 to 5 to make a diagnosis of abnormality in the variable intake valve lift devices 17, 18 of the following two systems. First, as shown in FIG. 8, a maximum value AFmax of and a minimum value AFmin of an air-fuel ratio each cylinder are calculated. Besides, a maximum value AAFmax of and a minimum value AAFmin of air-fuel ratios of all the cylinders are calculated. That is, a maximum value AAFmax of maximum values AFmax of air-fuel ratios each cylinder and a minimum value AAFmin of minimum values AFmin of air-fuel ratios each cylinder are calculated.

Thereafter, variations DAF (=AFmax−AFmin) of air-fuel ratios of the respective cylinders and variations DAAF (=AAFmax−AAFmin) of air-fuel ratios of all the cylinders are calculated. Subsequently, abnormality in the variable intake valve lift devices 17, 18 is determined depending upon whether ratios of variations DAF of air-fuel ratios of the respective cylinders to variations DAAF of air-fuel ratios of all the cylinders are less than an abnormality threshold T1. When the variable intake valve lift devices 17, 18 are determined to be abnormal, presence and absence of abnormality in the variable intake valve lift devices 17, 18 is determined. In distinction from abnormality in other air system, fuel system, or the like, presence and absence of abnormality in the variable intake valve lift devices 17, 18 are determined on the basis of the magnitude relation of air-fuel ratios of the respective cylinders, and control states of the variable intake valve lift devices 17, 18, that is, a valve lift control command. In case of abnormality in the variable intake valve lift devices 17, 18, a variable intake valve lift device of either of the cylinder groups is determined to be abnormal.

Figure 7:
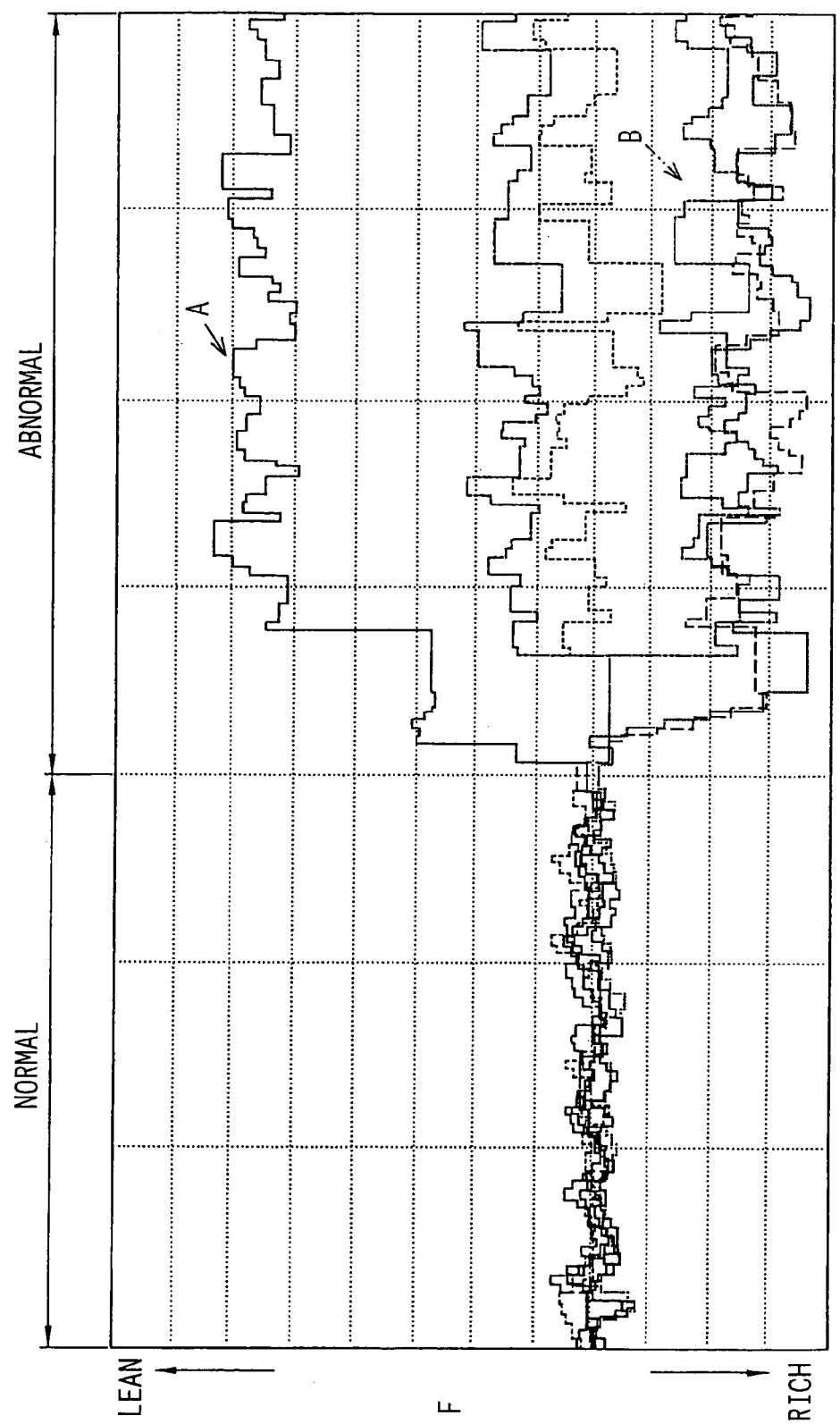
FIG. 7 is a time chart showing the behavior of cylinder-by-cylinder air-fuel ratios according to the first embodiment.

As shown in FIGS. 7 and 8, it is general that air-fuel ratios of the respective cylinders become substantially uniform in a normal state (normal area). However, when the variable intake valve lift device of one of the cylinder groups fails, a difference in air-fuel ratios F becomes large between the cylinder group, to which a normal variable intake valve lift device belongs, and the cylinder group, to which an abnormal variable intake valve lift device belongs. At this time, a normal state (normal area) shifts to an abnormal state (abnormal area). In the abnormal state, there is a tendency for division into the cylinder group A with large (lean) air-fuel ratios and the cylinder group B with small (rich) air-fuel ratios. Here, that cylinder group, in which the air-fuel ratio F changes in a direction contrary to a valve lift control command, can be determined to be an abnormal cylinder group, in which the variable intake valve lift device is abnormal. The valve lift control command is a control mode of the variable intake valve lift devices.

For example, the control mode of a variable intake valve lift device is in the high-lift mode. In this situation, when the variable intake valve lift device is driven in the low-lift mode due to failure, an associated cylinder group is decreased in intake air quantity. As a result, the air-fuel ratio changes in a rich direction. Therefore, a variable intake valve lift device of that cylinder group, in which the air-fuel ratio changes in the rich direction, can be determined to be abnormal.

Hereupon, according to the embodiment, that cylinder, of which an air-fuel ratio becomes maximum (leanest) among all the cylinders, and that cylinder, of which an air-fuel ratio becomes minimum (richest) among all the cylinders, are determined. Control modes (valve lift control command) of the variable intake valve lift devices 17, 18 of the respective cylinder groups are set. Cylinder group, to which a cylinder with a maximum air-fuel ratio belongs, and that cylinder group, to which a cylinder with a minimum air-fuel ratio belongs, are determined. In accordance with the relationship between the control modes and the cylinder group, an abnormal variable intake valve lift device of either of the cylinder groups is determined.

An explanation will be given to contents of processings in respective routines, which the ECU 23 executes for diagnosis of abnormality in the variable intake valve lift devices 17, 18.

An abnormality diagnosis main routine shown in FIG. 3 is executed at a predetermined interval (for example, 30.degree. CA period) in engine operation. When the present routine is started, a cylinder-by-cylinder air-fuel ratio estimation routine (not shown) is executed in STEP 101. In the cylinder-by-cylinder air-fuel ratio estimation routine, the cylinder-by-cylinder air-fuel ratio estimation model is used to estimate air-fuel ratios AF of the respective cylinders on the basis of a detection value of the air-fuel ratio sensor 21, that is, an actual air-fuel ratio of exhaust gases flowing through the exhaust collector 20. The processing in STEP 101 serves as cylinder-by-cylinder air-fuel ratio estimation means.

Thereafter, the procedure proceeds to STEP 102 to determine whether a predetermined period of time (for example, 3 to 5 seconds) has elapsed since the start of the present sampling. When the predetermined period of time has not elapsed, the procedure proceeds to STEP 103 to calculate maximum values AFmax of and minimum values AFmin of air-fuel ratios of the respective cylinders in the present sampling period. Subsequently, the procedure proceeds to STEP 104 to calculate a maximum value AAFmax of and a minimum value AAFmin of air-fuel ratios of all the cylinders in the present sampling period, and the routine is terminated.

When it is determined in the STEP 102 that the predetermined period of time has elapsed since the start of the present sampling, the procedure proceeds to STEP 106 to execute an abnormality diagnosis sub-routine shown in FIG. 4. In the abnormality diagnosis sub-routine, maximum values AFmax of and minimum values AFmin of air-fuel ratios of the respective cylinders, and a maximum value AAFmax of and a minimum value AAFmin of air-fuel ratios of all the cylinders are used to determine presence and absence of an abnormality in the variable intake valve lift devices 17, 18 in distinction from other abnormalities.

Thereafter, the procedure proceeds to STEP 107 to clear (reset) maximum values AFmax of and minimum values AFmin of air-fuel ratios of the respective cylinders, and a maximum value AAFmax of and a minimum value AAFmin of air-fuel ratios of all the cylinders.

The abnormality diagnosis sub-routine (STEP 106 in FIG. 3) shown in FIG. 4 is executed at a predetermined interval (for example, 180° CA period) in engine operation to serve as abnormality diagnosis means. When the present routine is started, it is determined in STEP 201 whether an engine operating state (for example, engine rotating speed, and an engine load such as intake pipe pressure, an intake air quantity, or the like) is in an abnormality diagnosis prohibition range A1. The abnormality diagnosis prohibition range A1 is set in a switchover position between control modes of the variable intake valve lift devices 17, 18, that is, a switchover position between the low-lift mode and the high-lift mode. The switchover position of the control modes is an operation area, in which a change in intake air quantity becomes small relative to a change in valve lift characteristics.

When it is determined in STEP 201 (FIG. 4) that the engine operating state is in the abnormality diagnosis prohibition range A1, the present routine is terminated without executing processings of abnormality diagnosis in STEP 202 and the succeeding STEPs.

On the other hand, when it is determined in STEP 201 that the engine operating state is not in the abnormality diagnosis prohibition range A1, processings of the abnormality diagnosis in STEP 202 and the succeeding STEPs are executed in the following manner.

First, variations DAF of air-fuel ratios are calculated for each cylinder with the following formula in STEP 202.

$$DAF = AFmax - AFmin$$

Thereafter, the procedure proceeds to STEP 203 to calculate variations DAAF of air-fuel ratios of all the cylinders with the following formula.

$$DAAF = AAFmax - AAFmin$$

Thereafter, the procedure proceeds to STEP 204 to determine whether ratios of variations DAF of air-fuel ratios of the respective cylinders to variations DAAF of air-fuel ratios of all the cylinders are less than the abnormality threshold T1. The abnormality threshold T1 may be a fixed value but may be modified according to an engine rotating speed, an intake air quantity, an intake valve timing, or the like.

When it is determined in STEP 204 that ratios of variations DAF of air-fuel ratios of the respective cylinders to variations DAAF of air-fuel ratios of all the cylinders are less than the abnormality threshold T1, it is determined that there is a possibility of abnormality in the variable intake valve lift devices 17, 18. In this case, the procedure proceeds to STEP 205. In STEP 205, an abnormality region determining routine shown in FIG. 5 is executed, and in distinction from other abnormalities, presence and absence of abnormality in the variable intake valve lift devices 17, 18 are determined. In case of presence of an abnormality in the variable intake valve lift devices 17, 18, a variable intake valve lift device of either of the cylinder groups is determined to be abnormal.

Thereafter, the procedure proceeds to STEP 206 to light an alarm lamp 26 (FIG. 1) provided to an instrument panel around a driver's seat, or indicate an alarm on an alarm display unit (not shown) on the instrument panel to give an alarm to a driver. The procedure proceeds to STEP 207 to store the abnormality information (abnormal cord, etc.) in a rewritable nonvolatile memory such as a backup RAM (not shown) of the ECU 23.

Thereafter, the procedure proceeds to STEP 208 to prohibit abnormality diagnosis such as detection of accidental fire, catalyst deterioration diagnosis, fuel system abnormality diagnosis, abnormality diagnosis of the air-fuel ratio sensor. Thus, the present routine is terminated.

In contrast, when it is determined in STEP 204 that ratios of variations DAF of air-fuel ratios of the respective cylinders to variations DAAF of air-fuel ratios of all the cylinders are equal to or greater than the abnormality threshold T1, the procedure proceeds to STEP 209. In STEP 209, it is concluded that no abnormality (normal) is involved in the variable intake valve lift devices 17, 18, and the present routine is terminated.

Subsequently, an explanation will be given to contents of processings in the abnormality region determining routine of FIG. 5 executed in STEP 205 for the abnormality diagnosis sub-routine of FIG. 4. When the present routine is started, that cylinder (maximum air-fuel ratio cylinder CMAX), of which an air-fuel ratio is maximum, among all the cylinders is first determined in STEP 301. Subsequently, the procedure proceeds to STEP 302 to determine that cylinder (minimum air-fuel ratio cylinder CMIN), of which air-fuel ratio is minimum, among all the cylinders.

Thereafter, the control modes (valve lift control command) of the variable intake valve lift devices 17, 18 of the cylinder groups A, B, to which the maximum air-fuel ratio cylinder CMAX belongs, are determined in STEP 303 to STEP 306. The control modes (valve lift control command) of the variable intake valve lift devices 17, 18 of the cylinder group, to which the minimum air-fuel ratio cylinder CMIN belongs, are determined in STEP 303 to STEP 306.

When it is determined in STEP 303 that the control modes of both the cylinder groups A, B are in the low-lift mode, the maximum air-fuel ratio cylinder CMAX belongs to the group A, and the minimum air-fuel ratio cylinder CMIN belongs to the group B, it is concluded that although the control modes of both the cylinder groups A, B are in the low-lift mode, an actual drive state of the group B remains in the high-lift mode. Therefore, the procedure proceeds to STEP 307 to determine that the variable intake valve lift device 18 of the group B is abnormal.

Besides, when it is determined in STEP 304 that the control modes of both the cylinder groups A, B are in the low-lift mode, the maximum air-fuel ratio cylinder CMAX belongs to the group B, and the minimum air-fuel ratio cylinder CMIN belongs to the group A, it is concluded that although the control modes of both the cylinder groups A, B are in the low-lift mode, an actual drive state of the group A remains in the high-lift mode. Therefore, the procedure proceeds to STEP 308 to determine that the variable intake valve lift device 17 of the group A is abnormal.

Besides, when it is determined in STEP 305 that the control modes of both the cylinder groups A, B are in the high-lift mode, the maximum air-fuel ratio cylinder CMAX belongs to the group A, and the minimum air-fuel ratio cylinder CMIN belongs to the group B, it is concluded that although the control modes of both the cylinder groups A, B are in the high-lift mode, an actual drive state of the group B remains in the low-lift mode. Therefore, the procedure proceeds to STEP 307 to determine that the variable intake valve lift device 18 of the group B is abnormal.

Besides, when it is determined in STEP 306 that the control modes of both the cylinder groups A, B are in the high-lift mode, the maximum air-fuel ratio cylinder CMAX belongs to the group B, and the minimum air-fuel ratio cylinder CMIN belongs to the group A, it is concluded that although the control modes of both the cylinder groups A, B are in the high-lift mode, an actual drive state of the group A remains in the low-lift mode. Therefore, the procedure proceeds to STEP 308 to determine that the variable intake valve lift device 17 of the group A is abnormal.

When it is determined to be "No" in all the STEP 303 to STEP 306, the procedure proceeds to STEP 309 to conclude that abnormality is involved in other air system, fuel system or the like.

In the embodiment, air-fuel ratio estimate values of the respective cylinders and the control modes of the variable intake valve lift devices 17, 18 of the two systems are combined to perform an abnormality diagnosis. Therefore, abnormality of the variable intake valve lift devices 17, 18 can be diagnosed in distinction from abnormality involved in other air system, fuel system, or the like.

As described above, when a variable intake valve lift device of one of the cylinder groups fails, a difference in air-fuel ratio between a normal cylinder group and an abnormal cylinder group is increased in the variable intake valve lift devices. Here, there is a tendency for division into a cylinder group with rich air-fuel ratios and a cylinder group with lean air-fuel ratios. That is, it has been noticed that when either of the variable intake valve lift devices becomes abnormal, a difference in air-fuel ratio estimate value between a normal cylinder group and an abnormal cylinder group is increased. Therefore, whether either of the variable intake valve lift devices of the cylinder groups is abnormal is determined on the basis of the magnitude relation of air-fuel ratios of the respective cylinders, and control modes (valve lift control command) of the variable intake valve lift devices. Besides, there is a tendency that air-fuel ratio estimate values of cylinders controlled by an abnormal variable intake valve lift device do not correspond to a controlled state of the abnormal variable intake valve lift device. Accordingly, either one or ones of multiple variable intake valve lift devices, which are abnormal, can be determined on the basis of the magnitude relation of air-fuel ratios of respective cylinders, and controlled states of the multiple variable intake valve lift devices. Thereby, an abnormal variable intake valve lift device or devices can be accurately determined. Besides, a demand for reduction in cost can be met without newly providing a lift sensor and a hydraulic sensor, which serve to determine an abnormal variable intake valve lift device or devices.

Here, when the engine operating state is in the operating range, in which a change in intake air quantity is small relative to a change in valve lift characteristics, changes in air-fuel ratios of respective cylinders become small relative to changes in valve lift characteristics. Accordingly, in such operating range, differences among air-fuel ratio estimate values are small even when the variable intake valve lift devices 17, 18 are different in valve lift characteristics between a normal cylinder group and an abnormal cylinder group. Therefore, abnormality diagnosis of the variable intake valve lift devices 17, 18 is degraded in accuracy, and is tend to cause erroneous diagnosis.

Hereupon, according to the embodiment, the operating range, in which a change in intake air quantity is small relative to a change in valve lift characteristics, is set to the abnormality diagnosis prohibition range A1. That is, when an engine operating range is in the abnormality diagnosis prohibition range A1, abnormality diagnosis of the variable intake valve lift devices 17, 18 is prohibited. Therefore, when the engine operating state is in the operating range, in which a change in intake air quantity is small relative to a change in valve lift characteristics, that is, in that operating range, in which abnormality diagnosis of the variable intake valve lift devices 17, 18 is degraded in accuracy, abnormality diagnosis of the variable intake valve lift devices 17, 18 is not performed. Therefore, erroneous diagnosis can be beforehand prevented in abnormality diagnosis of the variable intake valve lift devices 17, 18.

In addition, instead of prohibiting abnormality diagnosis of the variable intake valve lift devices 17, 18 in the abnormality diagnosis prohibition range A1, conditions of abnormality determination may be made strict. Specifically, the abnormality threshold T1 used in STEP 204 shown in FIG. 4 is decreased, so that it may be hard to be determined "Yes" in the abnormality diagnosis prohibition range A1 in STEP 204. Thereby, abnormality diagnosis of the variable intake valve lift devices can be prohibited, when abnormality diagnosis of the variable intake valve lift devices is degraded in accuracy. Besides, conditions of abnormality determination are made strict, so that the erroneous diagnosis can be prevented beforehand.

By the way, when either of the variable intake valve lift devices becomes abnormal, differences in air-fuel ratio among cylinders become large. As a result, an associated internal combustion engine is increased in rotational fluctuation. Therefore, detection of accidental fire caused by rotational fluctuation of the internal combustion engine is degraded in accuracy. Besides, when either of the variable intake valve lift devices becomes abnormal, the air-fuel ratio becomes unstable. Therefore, diagnoses such as catalyst deterioration diagnosis, fuel system abnormality diagnosis, abnormality diagnosis of the air-fuel ratio sensor, which are based on air-fuel ratios, are degraded in accuracy.

Therefore, according to the embodiment, when abnormality in the variable intake valve lift devices 17, 18 is determined, other abnormality diagnoses such as detection of accidental fire, catalyst deterioration diagnosis, fuel system abnormality diagnosis, abnormality diagnosis of the air-fuel ratio sensor are prohibited. That is, when abnormality in the variable intake valve lift devices 17, 18 causes a possibility that abnormality diagnoses such as detection of accidental fire, catalyst deterioration diagnosis, fuel system abnormality diagnosis, abnormality diagnosis of the air-fuel ratio sensor are degraded in accuracy, such abnormality diagnoses are prohibited. Therefore, erroneous diagnosis due to abnormality in the variable intake valve lift devices 17, 18 can be beforehand prevented in other abnormality diagnoses.

(Second Embodiment)

Figure 9:
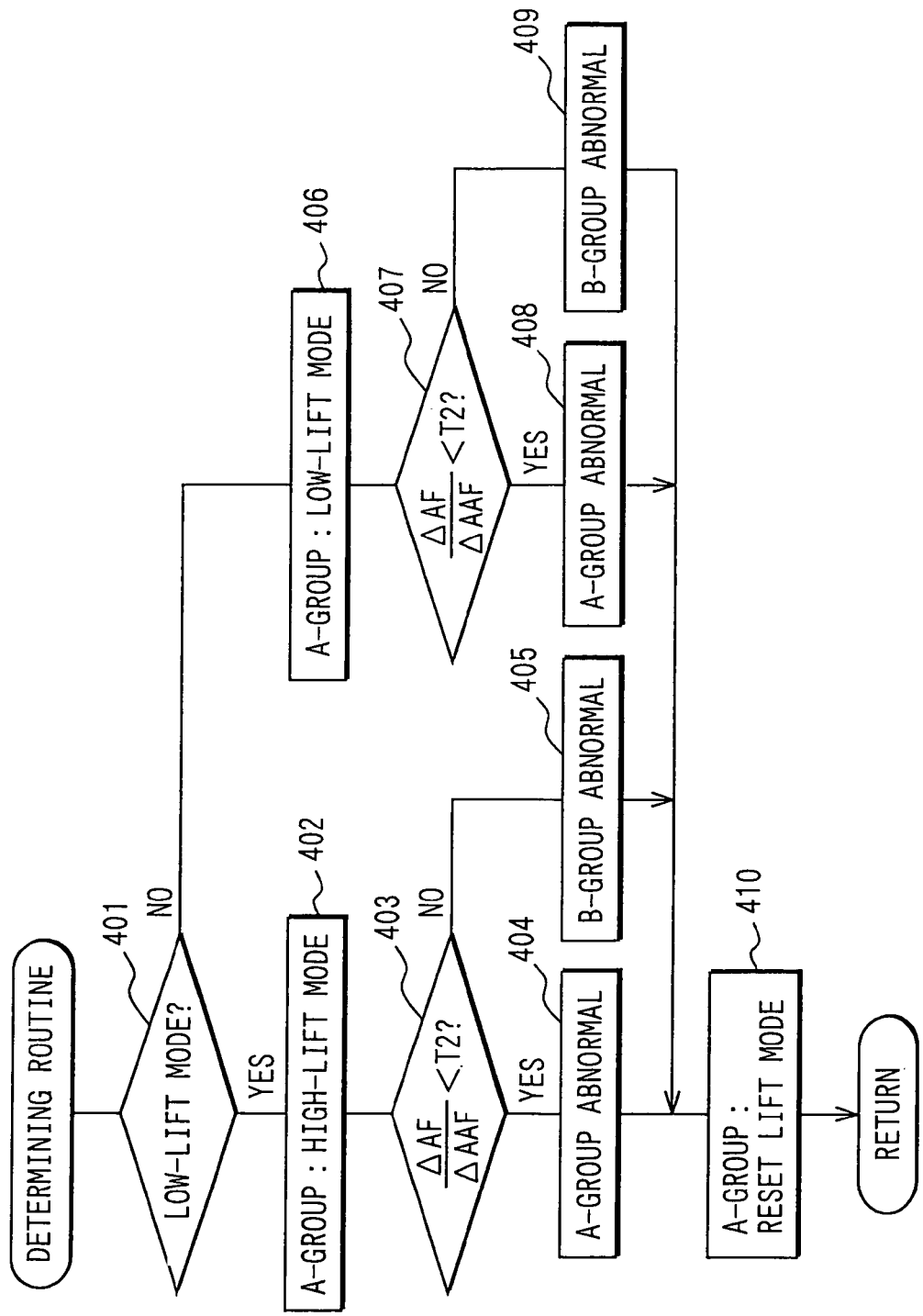
FIG. 9 is a flowchart showing an abnormality region determining routine according to a second embodiment of the present invention.

In the second embodiment, an abnormality region determining routine shown in FIG. 9 is executed. The abnormality region determining routine corresponds to STEP 205 shown in FIG. 4. In the abnormality region determining routine, a variable intake valve lift device of one of two A/B cylinder groups out of the variable intake valve lift devices 17, 18 of the cylinder groups is forcedly modified in control mode. It is determined whether the variable intake valve lift device of the cylinder group, which is forcedly modified in control mode, normally operates, on the basis of the magnitude relation of air-fuel ratio estimate values of respective cylinders, when the control mode is modified. That is, it is determined whether the valve lift characteristics normally changes. It is determined that which of the variable intake valve lift devices of the cylinder groups is abnormal, on the basis of results of determination.

First, it is determined in STEP 401 whether control modes of the variable intake valve lift devices 17, 18 of both the A and B groups are in the low-lift mode. When it is determined that the control modes are in the low-lift mode, the procedure proceeds to STEP 402 to forcedly switch over the control mode of the variable intake valve lift device 17 of the A group to the high-lift mode.

Thereafter, the procedure proceeds to STEP 403 to determine whether ratios of variations DAF of air-fuel ratios of the respective cylinders to variations DAAF of air-fuel ratios of all the cylinders are less than an abnormality threshold T2. In addition, before change of the control mode of the variable intake valve lift device 17 of the A group, it is determined in STEP 204 shown in FIG. 4 that ratios of variations DAF of air-fuel ratios of the respective cylinders to variations DAAF of air-fuel ratios of all the cylinders are less than the abnormality threshold T1. The abnormality threshold T1 in STEP 204 may be the same as the abnormality threshold T2 in STEP 403 and STEP 407.

When after the control mode of the variable intake valve lift device 17 of the A group is forcedly changed to the high-lift mode, and it is continuously determined in STEP 403 that ratios of variations DAF of air-fuel ratios of the respective cylinders to variations DAAF of air-fuel ratios of all the cylinders are less than the abnormality threshold T2, it is concluded that the variable intake valve lift device 17 of the A group does not normally operate. Subsequently, the procedure proceeds to STEP 404 to determine that the variable intake valve lift device 17 of the A group is abnormal. Thereafter, the procedure proceeds to STEP 410 to restore the control mode of the variable intake valve lift device 17 of the A group to a normal control mode, that is, the low-lift mode in this case.

In contrast, when it is determined in STEP 403 that ratios of variations DAF of air-fuel ratios of the respective cylinders to variations DAAF of air-fuel ratios of all the cylinders are equal to or greater than the abnormality threshold T2, it is concluded that the variable intake valve lift device 17 of the A group operates normally. Subsequently, the procedure proceeds to STEP 405 to determine that the variable intake valve lift device 18 of the B group is abnormal. Thereafter, the procedure proceeds to STEP 410 to restore the control mode of the variable intake valve lift device 17 of the A group to a normal control mode, that is, the low-lift mode in this case.

When it is determined in STEP 401 that control modes of the variable intake valve lift devices 17,18 of the respective cylinder groups are not in the low-lift mode, that is, are in the high-lift mode, the procedure proceeds to STEP 406. In STEP 406, the control mode of the variable intake valve lift device 17 of the A group is forcedly switched over to the low-lift mode.

Thereafter, the procedure proceeds to STEP 407 to determine whether ratios of variations DAF of air-fuel ratios of the respective cylinders to variations DAAF of air-fuel ratios of all the cylinders are less than the abnormality threshold T2.

When after the control mode of the variable intake valve lift device 17 of the A group is forcedly changed to the low-lift mode, and it is continuously determined in STEP 407 that ratios of variations DAF of air-fuel ratios of the respective cylinders to variations DAAF of air-fuel ratios of all the cylinders are less than the abnormality threshold T2, it is concluded that the variable intake valve lift device 17 of the A group does not normally operate. Subsequently, the procedure proceeds to STEP 408 to determine that the variable intake valve lift device 17 of the A group is abnormal. Thereafter, the procedure proceeds to STEP 410 to restore the control mode of the variable intake valve lift device 17 of the A group to a normal control mode, that is, the high-lift mode in this case.

In contrast, when it is determined in STEP 407 that ratios of variations DAF of air-fuel ratios of the respective cylinders to variations DAAF of air-fuel ratios of all the cylinders are equal to or greater than the abnormality threshold T2, it is concluded that the variable intake valve lift device 17 of the A group normally operates. Subsequently, the procedure proceeds to STEP 409 to determine that the variable intake valve lift device 18 of the B group is abnormal. Thereafter, the procedure proceeds to STEP 410 to restore the control mode of the variable intake valve lift device 17 of the A group to a normal control mode, that is, the high-lift mode in this case.

According to the embodiment, a variable intake valve lift device of one of the cylinder groups out of the variable intake valve lift devices 17, 18 of the two cylinder groups is forcedly modified in control mode. In this condition, the variable intake valve lift devices of the cylinder groups being abnormal are determined on the basis of the magnitude relation of air-fuel ratio estimate values of the respective cylinders.

That is, when the variable intake valve lift device of either system is forcedly modified in control mode, and air-fuel ratio estimate values of the cylinder group in such system change, it means that the variable intake valve lift device in the system is normal. Accordingly, when the variable intake valve lift device of either system is forcedly modified in control mode, and air-fuel ratio estimate values of the cylinder group in such system do not change, or change in an opposite direction, it may be determined that the variable intake valve lift device in the system is abnormal. Thereby, an abnormal variable intake valve lift device can be accurately determined, and a demand for reduction in cost without newly providing sensors, which serve to determine an abnormal variable intake valve lift device, can be satisfied.

Besides, cylinder-by-cylinder air-fuel ratios may be estimated in any method. In the above embodiments, the air-fuel ratio sensor is provided to the exhaust manifold, through which exhaust gases from the respective cylinders collectively flow. Besides, cylinder-by-cylinder air-fuel ratios are estimated on the basis of an output of the air-fuel ratio sensor. With such arrangement, air-fuel ratios of the respective cylinders can be estimated with a single air-fuel ratio sensor. Thus, cost can be reduced.

The present invention is applicable to a system provided with cylinder-by-cylinder intake air quantity detecting means 90 (FIG. 1) that estimates or detects intake air quantities (in-cylinder filled air quantities) of the respective cylinders. In this case, at the time of abnormality diagnosis of the variable intake valve lift devices 17, 18, intake air quantities of the respective cylinders may be used in place of air-fuel ratio estimate values of the respective cylinders. This is because intake air quantities of the respective cylinders are correlated to air-fuel ratios of the respective cylinders.

The present invention is applicable to a system provided with cylinder-by-cylinder fuel injection quantity detecting means 91 (FIG. 1) that calculates fuel injection quantities of the respective cylinders. In this case, fuel injection quantities of the respective cylinders, or air-fuel ratio correction quantities for the fuel injection quantities may be used in place of air-fuel ratio estimate values of the respective cylinders. This is because fuel injection quantities of the respective cylinders and air-fuel ratio correction quantities are also correlated to air-fuel ratios of the respective cylinders.

Besides, in the embodiment, the present invention is applied to a system provided with the variable intake valve lift devices provided to each cylinder group, and which of the variable intake valve lift devices of the cylinder groups being abnormal is determined. However, which of cylinders for the variable intake valve lift devices being abnormal may be determined.

Besides, only a part of multiple cylinders, which are controlled by a single variable valve lift device, may become abnormal in valve lift action. Therefore, cylinder or cylinders, of which valve lift action is abnormal, may be determined, on the basis of the magnitude relation of air-fuel ratio estimate values of the respective cylinders and a control mode of the variable valve lift device. Thereby, even when multiple cylinders, which are controlled by a single variable valve lift device, become only partially abnormal in valve lift action, cylinder or cylinders, of which valve lift action is abnormal, can be determined.

Besides, according to the above embodiments, the present invention is applied to a system, which controls variable intake valve lift devices on a side of intake valves. However, the present invention may be applied to a system, which controls variable intake valve lift devices on a side of exhaust valves. Besides, the present invention may be applied to a system, in which solenoid valves are provided to each cylinder and valve lift is independently varied for each cylinder.

Furthermore, the present invention is not limited to 6-cylinder engines, but may be applied to 5-cylinder or less cylinder engines, or 7-cylinder or more cylinder engines. Besides, the present invention is not limited to series engines, but can be applied to various types of engines such as V-type engines, horizontal opposed engines.

(Third Embodiment)

Figure 10:
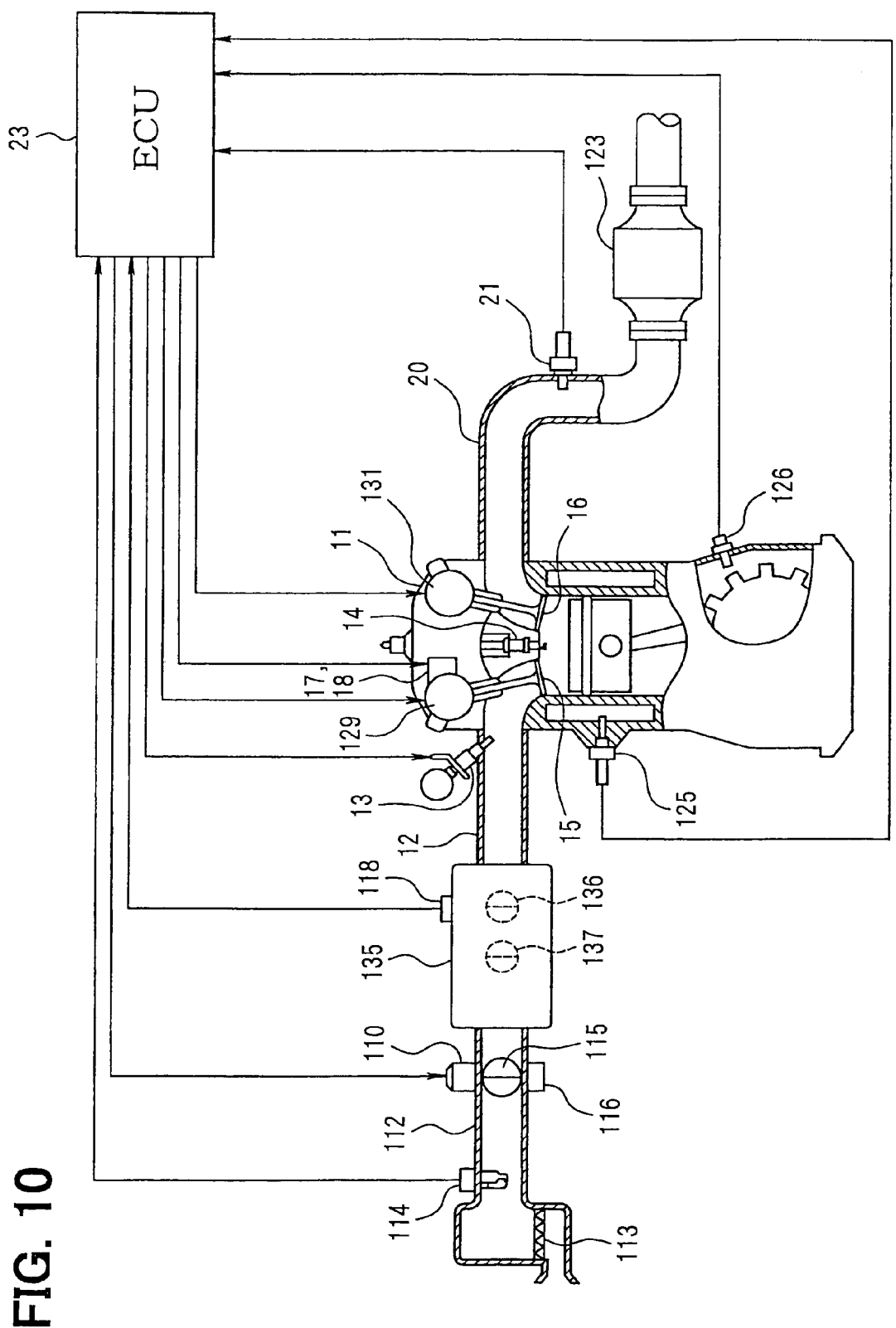
FIG. 10 is a schematic view showing an entire engine control system according to a third embodiment of the present invention.

As shown in FIG. 10, an air cleaner 113 is provided in an upstream-most region of an intake pipe 112 of an internal combustion engine 11. An air flowmeter 114 for detection of an intake air quantity Q is provided on a downstream side of the air cleaner 113. A throttle valve 115 is provided on a downstream side of the air flowmeter. An opening degree of the throttle valve 115 is regulated by a motor 110. A throttle opening-degree sensor 116 is provided for detection of a throttle opening degree.

Figure 11:
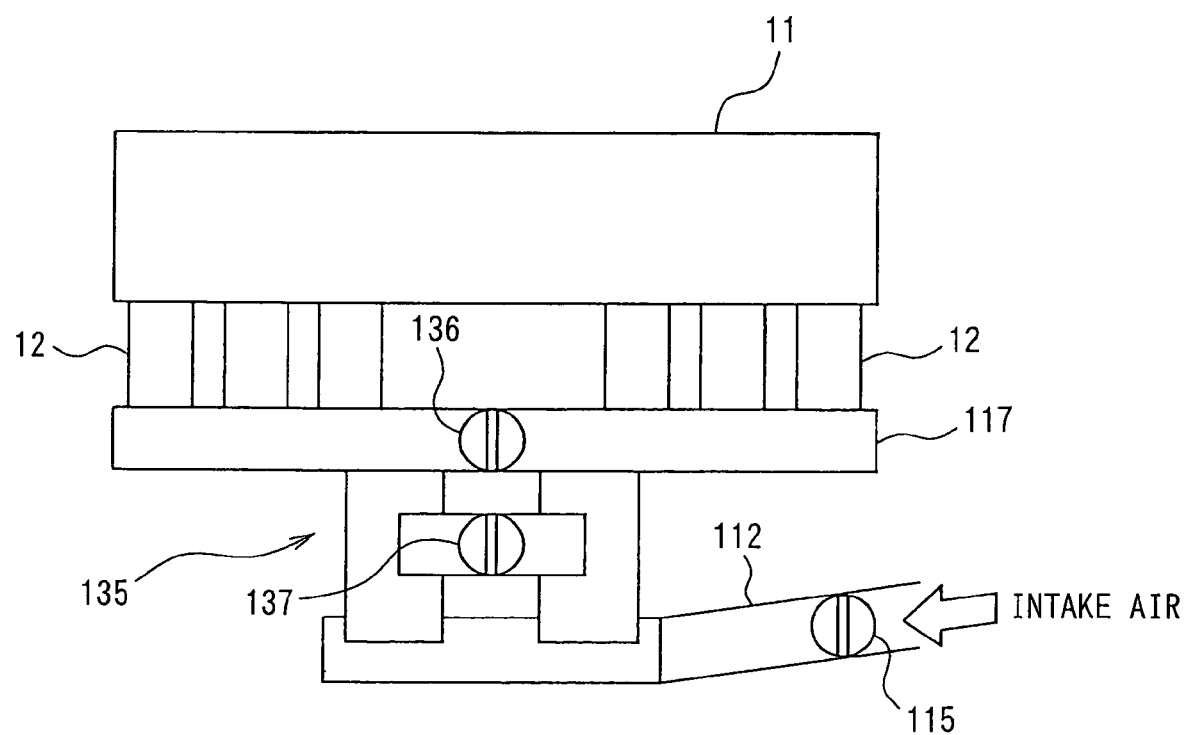
FIG. 11 is a schematic view showing a variable intake passage device according to the third embodiment.

Further, as shown in FIG. 11, a variable intake passage device 135 (intake efficiency varying means) is provided on the downstream side of the throttle valve 115. The variable intake passage device 135 varies a length of an intake passage extending from the throttle valve 115 to a surge tank 117. A primary valve 136 and a secondary valve 137 are provided in the variable intake passage device 135. Opening/closing of the primary valve 136 and the secondary valve 137 is switched over in accordance with the engine operating state, so that the intake passage in the variable intake passage device 135 is varied to change the length of the intake passage. Besides, as shown in FIG. 1, the variable intake passage device 135 is provided with an intake-pipe pressure sensor 118, which detects the intake-pipe pressure (operating-state detection means).

As shown in FIG. 2, the intake manifolds 12 for introduction of air into respective cylinders of the engine 11 are provided to the surge tank 117. The fuel injection valves 13 (FIG. 1), which jet a fuel, are respectively mounted in the vicinity of intake ports of the intake manifolds 12 of the respective cylinders. The ignition plugs 14 are mounted to each cylinder on the cylinder head of the engine 11. Spark discharge of the respective ignition plugs 14 causes ignition of a fuel-air mixture in the cylinders.

Besides, hydraulically operated variable valve timing devices 129, 131 (intake efficiency varying means), which hydraulically vary valve timings of the intake valves 15 and the exhaust valves 16, are provided on an intake side of and an exhaust side of the engine 11. Further, variable valve lift devices 17, 18 (intake efficiency varying means), which vary lift of the intake valves 15, are provided on the intake side of the engine 11. In addition, variable valve lift devices may be provided to the exhaust side of the engine 11.

On the other hand, a catalyst 123, such as three way catalyst, which purifies CO, HC, NOx, and the like in exhaust gases, is provided in an exhaust pipe (exhaust manifold) 20 of the engine 11. The air-fuel ratio sensor 21 is provided on an upstream side of the catalyst 123 to detect an air-fuel ratio F of exhaust gases.

Besides, a cooling-water temperature sensor 125 is mounted to the cylinder block of the engine 11 to detect cooling-water temperature. A crank-angle sensor 126 (operating-state detection means) is mounted to the cylinder block of the engine 11 to output a pulse signal for each time, in which a crankshaft of the engine 11 rotates for a predetermined crank angle. A crank angle and an engine rotating speed are detected on the basis of an output signal of the crank-angle sensor 126.

Outputs of such various sensors are input into the ECU 23. The ECU 23 is mainly constructed of a microcomputer, and executes various engine control programs stored in a built-in ROM (storage medium) to control fuel injection quantities of the fuel injection valves 13 and ignition timings of the ignition plugs 14, in accordance with the engine operating state. Besides, the ECU 23 controls three intake efficiency varying means (the variable intake passage device 135, the variable valve timing devices 129, 131, and the variable valve lift devices 17, 18) in accordance with the engine operating state to vary intake efficiency.

Figure 12:
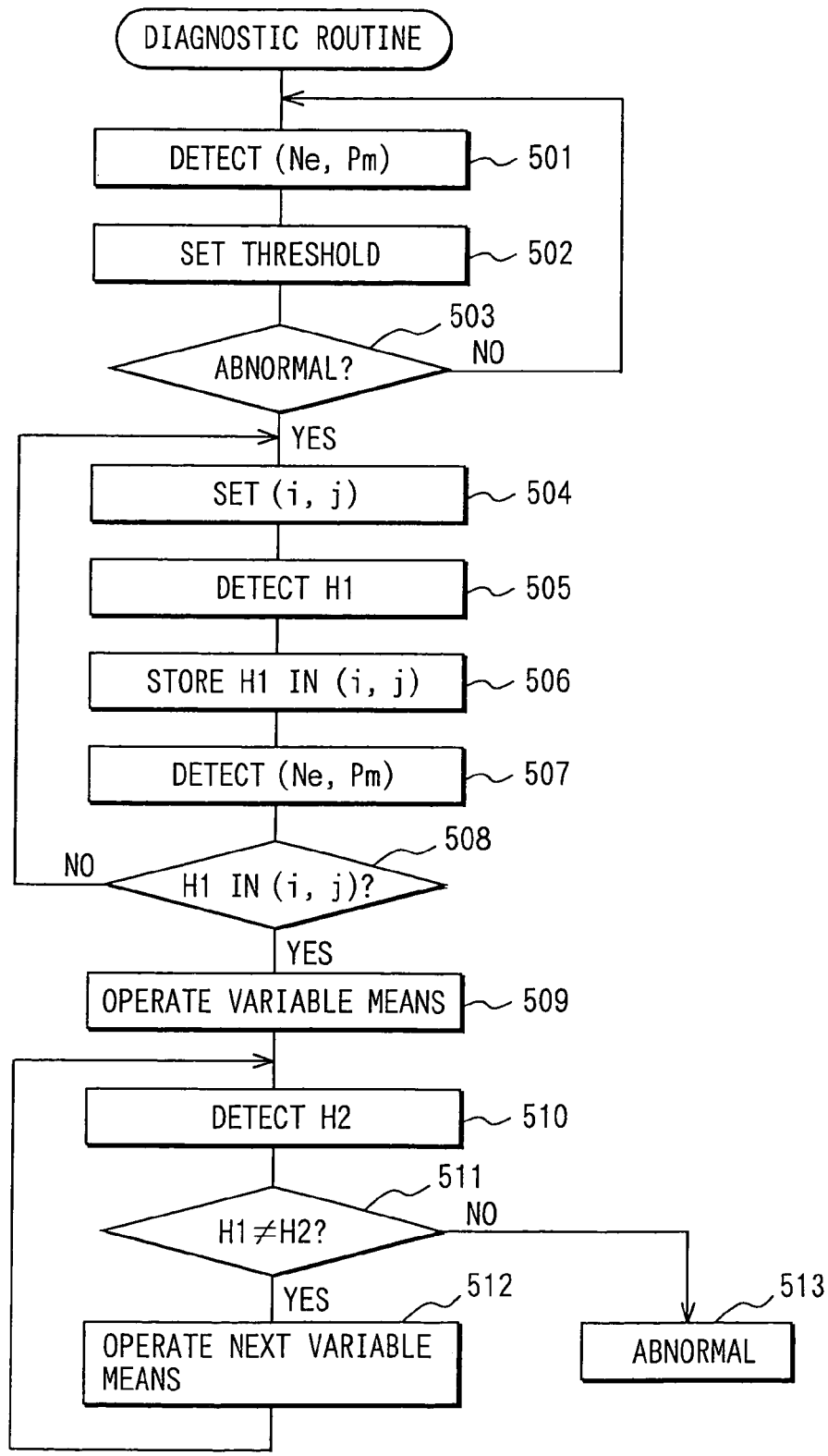
FIG. 12 is a flowchart showing an abnormality diagnostic routine according to the third embodiment.

Besides, the ECU 23 executes an abnormality diagnostic routine shown in FIG. 12 during engine operating. In the abnormality diagnostic routine shown in FIG. 12, it is determined whether a state of intake efficiency varying control is abnormal. Specifically, a state of intake efficiency varying control performed by three intake efficiency varying means (the variable intake passage device 135, the variable valve timing devices 129, 131, the variable valve lift devices 17, 18) is determined on the basis of an engine operating state detected by the intake-pipe pressure sensor 118 and the crank-angle sensor 126. All of such intake efficiency varying means are typical systems that respectively vary intake efficiency. The ECU 23 forcedly drives three intake efficiency varying means one by one, when it is determined that a state of intake efficiency varying control is abnormal. Thereby, normality/abnormality of the intake efficiency varying means is determined on the basis of whether an intake pipe pressure detected by the intake-pipe pressure sensor 118 changes in amplitude (amplitude of intake pulsation) by forced driving of the intake efficiency varying means. Thereby, the intake efficiency varying means being abnormal is determined.

A change in operating condition of the intake efficiency varying means significantly appears as a change in amplitude of detected values of intake pipe pressure, intake air quantity, air-fuel ratio, and the like. Therefore, normality/abnormality of the intake efficiency varying means can be accurately determined depending upon whether such detected values change in amplitude by forced driving of the intake efficiency varying means. In particular, intake pipe pressure changes in amplitude in good response to a change in the operating condition of the intake efficiency varying means. Accordingly, amplitude of intake pipe pressure is detected, so that accuracy in abnormality diagnosis can be further enhanced.

Here, intake efficiency varying means being abnormal may be determined by forcedly driving multiple intake efficiency varying means one by one instantly when abnormality in any one of the intake efficiency varying means is detected on the basis of an operating state of the internal combustion engine. However, torque shock or the like may arise depending upon the operating state of the internal combustion engine, when the intake efficiency varying means is forcedly driven.

In this embodiment, in order to lessen an extent, to which an engine operating state gets worse due to forced driving of the intake efficiency varying means, three intake efficiency varying means are forcedly driven one by one in the order of increasing extent (extent of occurrence of accidental fire, torque fluctuation, and the like), to which an engine operating state gets worse due to forced driving. Further, forced driving of the intake efficiency varying means is carried out, when an operating condition becomes the same as or similar to an operating condition at the time of ordinary operation.

Thereby, intake efficiency varying means being abnormal can be determined without occurrence of torque shock and the like due to forced driving of the intake efficiency varying means. Besides, intake efficiency varying means being abnormal can be determined, while an extent, to which an engine operating state gets worse due to forced driving of the intake efficiency varying means, is restricted to the minimum.

Subsequently, the abnormality diagnostic routine according to this embodiment will be specifically described. The abnormality diagnostic routine shown in FIG. 12 is started upon ON operation of an ignition switch (not shown). When the present routine is started, output signals of the intake-pipe pressure sensor 118 and the crank-angle sensor 126 are input in STEP 501 to detect the present engine operating state (for example, an engine rotating speed Ne, an intake pipe pressure Pm). Subsequently, the procedure proceeds to STEP 502 to set an abnormality threshold (for example, upper and lower limits in a normal range) conformed to the present engine operating state (Ne, Pm) in accordance with a data map or the like.

Subsequently, the procedure proceeds to STEP 503 to make a comparison between the present engine operating state (Ne, Pm) and the abnormality threshold. Depending upon whether the present engine operating state (Ne, Pm) is out of the normal range, it is determined whether a state of intake efficiency varying control performed by three intake efficiency varying means (the variable intake passage device 135, the variable valve timing devices 129, 131, the variable valve lift devices 17, 18) is abnormal. When the present engine operating state (Ne, Pm) is within the normal range, it is determined to be non-abnormal, and the procedure returns to STEP 501 to repeat the processing of detection of an engine operating state (Ne, Pm), the processing of setting of an abnormality threshold (STEP 502), and the processing of abnormality diagnosis (STEP 503) as described above.

Accordingly, while the three intake efficiency varying means normally operate, only abnormality of a state of intake efficiency varying control, which is performed by the three intake efficiency varying means, is repeatedly determined on the basis of an engine operating state (Ne, Pm) at a predetermined period of calculation. In this situation, forced driving of the intake efficiency varying means described later is not carried out. The processings in STEP 501 to STEP 503 serve as first abnormality determination means. Operating parameters used for abnormality diagnosis in STEP 503 are not limited to an engine rotating speed Ne and an intake pipe pressure Pm, but an intake air quantity Q detected by the air flowmeter 114 and an air-fuel ratio F detected by the air-fuel ratio sensor 21 may be used. This is because the intake air quantity Q and the air-fuel ratio F become abnormal in a behavior, when a state of intake efficiency varying control becomes abnormal in operation of an internal combustion engine.

Accordingly, whether any one of multiple intake efficiency varying means becomes abnormal can be detected by monitoring the behavior of the operating parameters and by detecting an abnormal behavior of the operating parameters generated when any one of multiple intake efficiency varying means becomes abnormal.

When it is determined in STEP 503 that a state of intake efficiency varying control is abnormal, that is, it is determined that any one of the three intake efficiency varying means is abnormal, the procedure proceeds to STEP 504. In STEP 504, that operating range (i, j), to which a present engine operating state (Ne, Pm) belongs, is determined. In subsequent STEP 505, an amplitude H1 of an intake pipe pressure Pm detected by the intake-pipe pressure sensor 118 is measured. In subsequent STEP 506, the amplitude H1 of the intake pipe pressure Pm as measured is stored for each operating range (i, j) in a memory (not shown) of the ECU 23.

In subsequent STEP 507, output signals of the intake-pipe pressure sensor 118 and the crank-angle sensor 126 are read once again to detect a present engine operating state (Ne, Pm). In subsequent STEP 508, it is determined whether the amplitude H1 of the intake pipe pressure Pm is stored in a storage area of that operating range (i, j), to which the present engine operating state (Ne, Pm) belongs. In case of being not stored, the processings in STEP 504 to STEP 507 are repeated. That is, amplitude H1 of an intake pipe pressure Pm is measured to be stored each operating range (i, j), and a present engine operating state (Ne, Pm) is detected once again.

When it is determined in STEP 508 that an amplitude H1 of an intake pipe pressure Pm is stored in a storage area of that operating range (i, j), to which the present engine operating state (Ne, Pm) detected in STEP 507 belongs, the procedure proceeds to STEP 509. In STEP 509, any one of the three intake efficiency varying means is forcedly driven in such operating range (i, j). When the three intake efficiency varying means are forcedly driven one by one, the three intake efficiency varying means are forcedly driven in the order of increasing extent (extent of occurrence of accidental fire, torque fluctuation, and the like), to which an engine operating state gets worse due to such forced driving. For example, forced driving is carried out in the order of the variable intake passage device 135→the variable valve lift devices 17, 18→the variable valve timing devices 129, 131, so that the extent, to which an engine operating state gets worse due to the forced driving of the intake efficiency varying means, is decreased. Further, forced driving of the intake efficiency varying means is carried out when an operating condition being the same as that at the time of ordinary operation or approximate thereto comes out.

Each time, in which one intake efficiency varying means is forcedly driven, the procedure proceeds to STEP 510 to measure an amplitude H2 of an intake pipe pressure Pm. In subsequent STEP 511, a comparison is made between amplitude H1 before forced driving and amplitude H2 after forced driving, and it is determined whether any change in amplitude is caused by forced driving. In case of no change in amplitude being caused by forced driving, the procedure proceeds to STEP 513 to determine that the intake efficiency varying means driven by force is abnormal.

In contrast, when it is determined in STEP 511 that forced driving causes a change in amplitude, it is concluded that the intake efficiency varying means forcedly driven normally operates, and the procedure proceeds to STEP 512. In STEP 512, the subsequent intake efficiency varying means is forcedly driven. Besides, an amplitude H2 of an intake pipe pressure Pm is measured (STEP 510), and it is determined whether any change in amplitude is caused by forced driving (STEP 511). Such processings are repeated until the intake efficiency varying means being abnormal is determined. In addition, the processings in STEP 504 to STEP 513 serve as second abnormality determination means.

In this embodiment, it is determined whether a state of intake efficiency varying control performed by three intake efficiency varying means (the variable intake passage device 135, the variable valve timing devices 129, 131, the variable valve lift devices 17, 18) is abnormal, on the basis of an engine operating state detected by the intake-pipe pressure sensor 118 and the crank-angle sensor 126. When it is determined that the state of intake efficiency varying control is abnormal, the three intake efficiency varying means are forcedly driven one by one, so that the intake efficiency varying means being abnormal is determined.

In short, when an operating state detected by the operating-state detection means is changed in accordance with forced driving of the intake efficiency varying means in that process, in which multiple intake efficiency varying means are forcedly driven one by one, it is determined that the intake efficiency varying means normally operates. When the operating state is not changed in accordance with forced driving, it is determined that the intake efficiency varying means abnormally operates. In this construction, when all the three intake efficiency varying means normally operate, abnormality diagnosis is made without forced driving of the intake efficiency varying means. Therefore, even when that frequency, in which abnormality diagnosis is made, is increased for the purpose of early detection of abnormality, abnormality diagnosis can be made without making operability get worse. Thus, when any one of the three intake efficiency varying means becomes abnormal in engine operation, such abnormality can be early detected. Besides, after detection of abnormality, intake efficiency varying means being abnormal can be determined by forcedly driving multiple intake efficiency varying means one by one.

Besides, forced driving of the intake efficiency varying means is carried out only when an operating condition becomes the same as or becomes similar to that at the time of ordinary operation. Therefore, occurrence of torque shock and the like, which are caused by forced driving of the intake efficiency varying means to determine intake efficiency varying means being abnormal, can be suppressed. However, when abnormality in any one of the intake efficiency varying means is detected on the basis of an engine operating state, intake efficiency varying means being abnormal may be determined by forcedly driving the three intake efficiency varying means one by one instantly.

Besides, in this embodiment, when the three intake efficiency varying means are forcedly driven one by one, the three intake efficiency varying means are forcedly driven in the order of increasing extent, to which an engine operating state gets worse due to such forced driving. Therefore, intake efficiency varying means being abnormal can be determined, while restricting an extent, to which an engine operating state gets worse due to forced driving of the intake efficiency varying means, to the minimum. However, the order of forced driving may be appropriately modified.

Besides, in this embodiment, intake efficiency varying means being abnormal is determined by use of amplitude of intake pipe pressure, which changes in good response to a change in the operating condition of the intake efficiency varying means. Thereby, the intake efficiency varying means being abnormal can be accurately determined. However, intake efficiency varying means being abnormal may be determined by use of any one of intake air quantity Q, air-fuel ratio F, and engine rotating speed Ne in place of intake pipe pressure. This is because the intake air quantity Q, the air-fuel ratio F, and the engine rotating speed Ne become abnormal in behavior when a state of any one of the intake efficiency varying control becomes abnormal in engine operation.

In addition, amplitude of one of the intake air quantity Q, the air-fuel ratio F, and the engine rotating speed Ne may be used in place of amplitude of intake pipe pressure. Alternatively, for example, loci, variations, and area (integrated values) of detected values (sensor outputs) may be used in place of amplitude.

Besides, the present invention is not limited to the construction of the embodiment, in which three intake efficiency varying means (the variable intake passage device 135, the variable valve timing devices 129, 131, the variable valve lift devices 17, 18) are provided, but can be embodied in application to an engine provided with two or four or more intake efficiency varying means.

Contents of the embodiments can be modified by way of an appropriate combination or the like.

Various modifications and alternations may be diversely made to the above embodiments without departing from the spirit of the present invention.

What is claimed is:

1. An apparatus that diagnoses an abnormality of a variable valve lift control system having a variable valve lift device, the variable valve lift device varying a valve lift characteristics of at least one of an intake valve and an exhaust valve of each cylinder in an internal combustion engine, the apparatus comprising:
    a cylinder-by-cylinder air-fuel ratio estimation means that estimates an air-fuel ratio of each cylinder; and
    an abnormality diagnosis means that diagnoses presence or absence of an abnormality in the variable valve lift device on the basis of an air-fuel ratio estimate value of each cylinder and a controlled state of the variable valve lift device, wherein the air-fuel ratio estimate value of each cylinder is estimated by the cylinder-by-cylinder air-fuel ratio estimation means.

2. The apparatus according to claim 1, wherein the abnormality diagnosis means determines a cylinder, which is abnormal in valve lift action, on the basis of a magnitude relation of the air-fuel ratio estimate value of each cylinder and the controlled state of the variable valve lift device.

3. The apparatus according to claim 2,
    wherein the abnormality diagnosis means determines a cylinder, which has a minimum air-fuel ratio estimate value, is abnormal when the variable valve lift device is in a low-lift mode; and
    the abnormality diagnosis means determines a cylinder, which has a minimum air-fuel ratio estimate value, is abnormal when the variable valve lift device is in a high-lift mode.

4. The apparatus according to claim 1, wherein the abnormality diagnosis means prohibits an abnormality diagnosis of the variable valve lift device or makes an abnormality determination condition strict when an operating state of the internal combustion engine is in an operating range, in which a change in intake air quantity is small relative to a change in the valve lift characteristics.

5. The apparatus according to claim 4, wherein the abnormality diagnosis means determines presence of an abnormality when a ratio of a variation between a maximum value and a minimum value of the air-fuel ratio of each cylinder to a variation between a maximum value and a minimum value of the air-fuel ratios of all the cylinders are less than an abnormality threshold.

6. The apparatus according to claim 5, wherein the abnormality diagnosis means sets the abnormality threshold to be small to make the abnormality determination condition strict when an operating state of the internal combustion engine is in the operating range, in which a change in intake air quantity is small relative to a change in the valve lift characteristics.

7. The apparatus according to claim 1, further comprising:
    an air-fuel ratio sensor provided to an exhaust manifold, through which exhaust gas from each cylinder collectively flow, to detect an air-fuel ratio of exhaust gas,
    wherein the cylinder-by-cylinder air-fuel ratio estimation means estimates air-fuel ratio of each cylinder on the basis of an output from the air-fuel ratio sensor.

8. The apparatus according to claim 1, further comprising:
    a cylinder-by-cylinder intake air quantity detecting means that estimates or detects an intake air quantity of each cylinder,
    wherein the abnormality diagnosis means diagnoses presence or absence of an abnormality in the variable valve lift device using the intake air quantity of each cylinder in place of the air-fuel ratio estimate value of each cylinder.

9. The apparatus according to claim 1, further comprising:
    a cylinder-by-cylinder fuel injection quantity detecting means that calculates a fuel injection quantity of each cylinder,
    wherein the abnormality diagnosis means diagnoses presence or absence of an abnormality in the variable valve lift device using one of the fuel injection quantity of each cylinder and an air-fuel ratio correction quantity for the fuel injection quantity, in place of the air-fuel ratio estimate value of each cylinder.

10. The apparatus according to claim 1, wherein abnormality diagnosis of other devices is prohibited when the abnormality diagnosis means determines presence of an abnormality in the variable valve lift device.

11. An apparatus that diagnoses an abnormality of a variable valve lift control system having variable valve lift devices of a plurality of systems, the variable valve lift devices of the plurality of systems varying the valve lift characteristics of at least one of an intake valve and an exhaust valve of each cylinder in an internal combustion engine, the apparatus comprising:
    a cylinder-by-cylinder air-fuel ratio estimation means that estimates an air-fuel ratio of each cylinder; and
    an abnormality diagnosis means that diagnoses presence or absence of an abnormality in the variable valve lift devices on the basis of an air-fuel ratio estimate value of each cylinder and controlled states of the variable valve lift devices,
    wherein the air-fuel ratio estimate value of each cylinder is estimated by the cylinder-by-cylinder air-fuel ratio estimation means.

12. The apparatus according to claim 11, wherein the abnormality diagnosis means determines a variable valve lift device, which is abnormal, out of the variable valve lift devices of the plurality of systems on the basis of a magnitude relation of the air-fuel ratio estimate value of each cylinder and the controlled states of the variable valve lift devices of the plurality of systems.

13. The apparatus according to claim 12,
    wherein the abnormality diagnosis means determines a variable valve lift device, which is abnormal, out of the variable valve lift devices of the plurality of systems in a manner that:

the abnormality diagnosis means determines a cylinder, of which an air-fuel ratio estimate value is minimum, is abnormal when the variable valve lift devices are in a low-lift mode; and the abnormality diagnosis means determines a cylinder, of which an air-fuel ratio estimate value is minimum, is abnormal when the variable valve lift devices are in a high-lift mode.

14. The apparatus according to claim 11, wherein the abnormality diagnosis means determines a variable valve lift device, which is abnormal, out of the variable valve lift devices of the plurality of systems on the basis of the magnitude relation of air-fuel ratio estimate value of each cylinder when a controlled state of a variable valve lift device of any system is forcedly modified.

15. The apparatus according to claim 14, wherein in the case where a ratio of a variation of the air-fuel ratio of each cylinder to a variation of air-fuel ratios of all the cylinders is less than an abnormality threshold when the variable valve lift device of any system is modified in lift mode to forcedly modify a controlled state, the abnormality diagnosis means determines the variable valve lift device of the system, which is modified in lift mode, to be abnormal.

16. The apparatus according to claim 11, wherein the abnormality diagnosis means determines a variable valve lift device, which is abnormal, out of the variable valve lift devices of the plurality of systems on the basis of the magnitude relation of air-fuel ratio estimate value of each cylinder, the magnitude relation of air-fuel ratio estimate values of all the cylinders, and controlled states of the variable intake valve lift devices of the plurality of systems.

17. The apparatus according to claim 16, wherein the abnormality diagnosis means determines a variable valve lift device, which is abnormal, out of the variable valve lift devices of the plurality of systems in accordance with a value, which is based on the variation of air-fuel ratio estimate value of each cylinder and the variation of air-fuel ratio estimate values of all the cylinders, and controlled states of the variable intake valve lift devices of the plurality of systems.

18. The apparatus according to claim 17, wherein the abnormality diagnosis means determines that the variable valve lift device, in which the cylinder against the controlled states of the variable intake valve lift devices of the plurality of systems is included, to be abnormal when the ratio of the variation of the air-fuel ratio estimate value of each cylinder to the variation of the air-fuel ratio estimate values of all the cylinders is less than an abnormality threshold.

19. An apparatus that diagnoses an abnormality of an internal combustion engine having a plurality of intake air efficiency varying means for varying intake air efficiency, the apparatus comprising:

an operating-state detection means that detects an operating state of the internal combustion engine;

a first abnormality determination means that determines whether a state of intake air efficiency varying control, which is performed by the plurality of intake air efficiency varying means, is abnormal on the basis of an operating state detected by the operating-state detection means; and a second abnormality determination means that forcedly drives the plurality of intake air efficiency varying means one by one when the first abnormality determination means determines that a state of the intake air efficiency varying control is abnormal, wherein the second abnormality determination means determines the intake air efficiency varying means, which is abnormal, depending upon whether the operating state detected by the operating-state detection means changes corresponding to forced driving of the intake air efficiency varying means.

20. The apparatus according to claim 19, wherein the plurality of intake air efficiency varying means includes at least one of a variable valve timing device, a variable valve lift device, and a variable intake passage device, the variable valve timing device controls an opening timing and closing timing of at least one of intake valves and exhaust valves, the variable valve lift device controls lift of at least one of intake valves and exhaust valves, and the variable intake passage device varies a length of an intake passage.

21. The apparatus according to claim 19, wherein the operating-state detection means detects at least one of intake pipe pressure, an intake air quantity, an air-fuel ratio, and engine rotating speed.

22. The apparatus according to claim 19, wherein the second abnormality determination means determines whether the intake air efficiency varying means is abnormal, depending upon whether a detected value of the operating-state detection means changes in amplitude corresponding to forced driving of the intake air efficiency varying means.

23. The apparatus according to claim 19, wherein the second abnormality determination means performs forced driving of the intake air efficiency varying means when an operating condition becomes the same as or becomes similar to an operating condition at the time of a normal operation.

24. The apparatus according to claim 19, wherein the second abnormality determination means forcedly drives the plurality of intake air efficiency varying means one by one in the order of increasing extent, to which an operating state of the internal combustion engine gets worse due to such forced driving.

25. A method of diagnosing an abnormality of a variable valve lift control system having a variable valve device which varies a valve lift characteristics of at least one of an intake valve and an exhaust valve of each cylinder in an internal combustion engine, the method comprising:

estimating an air fuel ratio of each cylinder; and diagnosing presence or absence of an abnormality in the variable valve lift device on the basis of a value of the estimated air-fuel ratio of each cylinder and a controlled state of the variable valve lift device.

26. The method as in claim 25, wherein estimating the air fuel ratio of each cylinder is performed on a cylinder-by-cylinder basis.

27. The method as in claim 25, wherein an abnormality in the variable valve lift device is diagnosed when a ratio of a variation between a maximum value and a minimum value of the air-fuel ratio of a cylinder to a variation between a maximum value and a minimum value of the air-fuel ratios of all of the cylinders are less than an abnormality threshold.

28. A method of diagnosing an abnormality of a variable valve lift control system having variable valve devices of a plurality of systems, which vary a valve lift characteristic of at least one of an intake valve and an exhaust valve of each cylinder in an internal combustion engine, the method comprising:

estimating an air fuel ratio of each cylinder; and diagnosing presence or absence of an abnormality in the variable valve lift devices on the basis of a value of the estimated air-fuel ratio of each cylinder and controlled states of the variable valve lift devices.

29. The method as in claim 28, wherein estimating the air fuel ratio of each cylinder is performed on a cylinder-by-cylinder basis.

30. The method as in claim 28, wherein an abnormality in the variable valve lift devices is diagnosed when a ratio of a variation between a maximum value and a minimum value of the air-fuel ratio of a cylinder to a variation between a maximum value and a minimum value of the air-fuel ratios of all of the cylinders are less than an abnormality threshold.

31. A method of diagnosing an abnormality of an internal combustion engine having a plurality of intake air efficiency varying mechanisms for varying intake air efficiency, the method comprising:

detecting an operating state of the internal combustion engine;

determining whether a state of intake air efficiency control, which is performed by the plurality of intake air efficiency varying mechanisms, is abnormal on the basis of the detected operating state;

forcedly driving the plurality of intake air efficiency varying mechanisms one by one when a determination has been made that a state of the intake air efficiency varying control is abnormal; and determining which of the intake air efficiency varying mechanisms is abnormal, depending upon changes in the detected operating state in response to the forcedly driving of the intake air efficiency varying mechanisms.

* * * * *